United States Patent
Le et al.

(10) Patent No.: US 7,649,712 B2
(45) Date of Patent: Jan. 19, 2010

(54) SELF ALIGNED WRAP AROUND SHIELD FOR PERPENDICULAR MAGNETIC RECORDING

(75) Inventors: Quang Le, San Jose, CA (US); Nian-Xiang Sun, Winchester, MA (US); Howard Gordon Zolla, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 656 days.

(21) Appl. No.: 11/116,753

(22) Filed: Apr. 27, 2005

(65) Prior Publication Data

US 2006/0044682 A1 Mar. 2, 2006

Related U.S. Application Data

(63) Continuation-in-part of application No. 10/931,649, filed on Aug. 31, 2004.

(51) Int. Cl.
 *G11B 5/33* (2006.01)
(52) U.S. Cl. .................................................. 360/125.3
(58) Field of Classification Search .................. None
 See application file for complete search history.

(56) References Cited

U.S. PATENT DOCUMENTS

| | | | | |
|---|---|---|---|---|
| 6,470,566 B2 | 10/2002 | Hsiao et al. | ............... | 29/603.13 |
| 6,660,640 B1 | 12/2003 | Miller et al. | ................ | 438/693 |
| 6,694,604 B2 | 2/2004 | Santini | ..................... | 29/603.14 |
| 6,809,899 B1 * | 10/2004 | Chen et al. | ............. | 360/125.13 |
| 6,842,313 B1 * | 1/2005 | Mallary | ....................... | 360/319 |
| 6,950,277 B1 * | 9/2005 | Nguy et al. | ............. | 360/125.14 |
| 7,196,871 B2 * | 3/2007 | Hsu et al. | .............. | 360/125.03 |
| 2002/0071208 A1 | 6/2002 | Batra et al. | .................. | 360/125 |
| 2002/0162791 A1 | 11/2002 | Jacobson | ..................... | 210/483 |
| 2002/0176214 A1 * | 11/2002 | Shukh et al. | ................. | 360/317 |
| 2003/0137779 A1 | 7/2003 | Santini et al. | ............... | 360/317 |
| 2003/0182789 A1 * | 10/2003 | Kagotani et al. | ......... | 29/603.14 |
| 2003/0193740 A1 | 10/2003 | Kruger et al. | ............... | 360/125 |
| 2004/0027716 A1 | 2/2004 | Chen et al. | ................... | 360/126 |
| 2004/0085674 A1 * | 5/2004 | Han et al. | .................... | 360/126 |
| 2004/0184190 A1 * | 9/2004 | Han et al. | .................... | 360/126 |

OTHER PUBLICATIONS

"Perpendicular Magnetic Recording: Writing Process," May 2004, Journal of Applied Physics, vol. 95, #9.

(Continued)

*Primary Examiner*—Mark Blouin
(74) *Attorney, Agent, or Firm*—Zilka-Kotab, PC

(57) ABSTRACT

A write element for use in perpendicular magnetic recording. The write element including a write pole and a self aligned wrap around shield that can have a trailing shield gap thickness that is different from its side shield gap thickness. The materials making up the trailing shield gap and the side shield gaps can be different materials or can be the same material deposited in two different steps. The side or wrap around portions of the trailing shield can extend down to the level of the leading edge of the write pole or can terminate at some point between the levels of the leading and trailing edge to form a partial wrap around trailing shield.

23 Claims, 21 Drawing Sheets

OTHER PUBLICATIONS

Tagawa et al., "High Performance Write Head Design and Materials," Dec. 2001, Fujitsu Sci Tech. Journal, 37,2, pp. 164-173.

Mark Kryder, "An Introduction to Magnetic Recording Heads," Seagate Research, 2403 Sidney St. Pittsburgh, PA 15211, USA, Mar. 1991.

Koji Matsumoto, "Perpendicular Magnetic Recording Using Magneto-Optical Media," Dec. 2001, Fujitsu Sci Tech. Journal, 37, 2, pp. 155,163.

Hitachi Global Storage Technologies, "Recording Head/Perpendicular Recording," http://www.hitachigst.com/hdd/research/recording _head/pr/, Mar. 29, 2005.

* cited by examiner

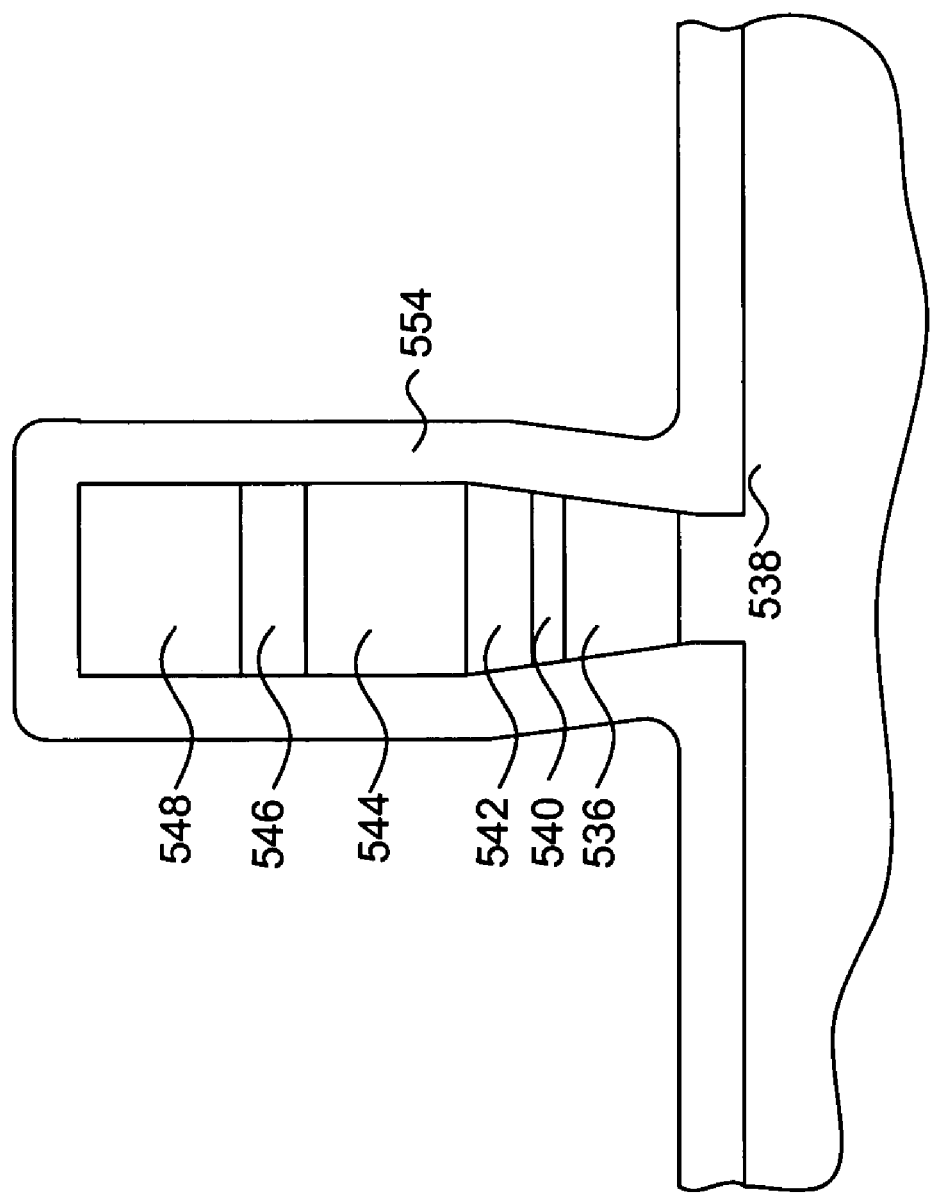

SELF ALIGNED WRAP AROUND SHIELD FOR PERPENDICULAR MAGNETIC RECORDING

This is a Continuation In Part of pending commonly assigned patent application Ser. No. 10/931,649, filed Aug. 31, 2004, entitled WRITE POLE AND METHOD OF MANUFACTURING THE SAME, by Le et al.

BACKGROUND OF THE INVENTION

Magnetic heads are used in disk drives to write information on to a moving magnetic media and to read the information stored thereon. Conventional magnetic heads include a write head and a read head. A write head should be capable of writing straight and sharp transitions. The write head should also be capable of writing the data on a given track without reducing the signal of adjacent or nearby tracks.

The write head may implement a longitudinal recording mode or a perpendicular recording mode for magnetically encoding data on a disk. A longitudinal write head, in accordance with the conventional art, is depicted in FIG. 1A. In longitudinal recording, a coil 105 wound around a toroid 110 generates a magnetic flux. The fringe field 115 proximate a gap in the toroid 110 causes orientation of a magnetic recording layer 120, having a horizontally orientated magnetic domain, on a disk as a function of the current through the coil 105.

A perpendicular write head, in accordance with the conventional art, is depicted in FIG. 1B. In perpendicular recording, a current flowing in the coil 155 creates a magnetic flux in a write pole 160. The magnetic flux 165 passes from the tip of the write pole 160, perpendicularly through the magnetic recording layer 170, having vertically orientated magnetic domain, and into a soft underlay 175. The bit cell recorded on the magnetic recording layer has a width representing track-width, a length representing linear density and a depth that provides the volume necessary to provide sufficient magnetization to be read by a sensor of the read head.

The areal density achievable by a write head is a product of the linear bit density and the track density. The linear bit density is the number of bits that can be written per linear inch along the track of the rotating magnetic disk. The track width density is the number of tracks that can be written per inch along a radius of the disk. The linear bit density depends upon the length of the bit along a track and the track-width density is dependent upon the width of the pole tip.

A perpendicular recording magnetic disk is thicker than a longitudinal disk and therefore provides sufficient magnetization for a bit cell having a decreased width and or length. Accordingly, the width and the length of the write probe at the tip (e.g., air bearing surface) can be reduced to increase the track-width density and/or linear bit density.

The flux field generated by the write pole is dependent upon the flare length, the flare point, the trailing edge and other structures of the write pole. Simultaneously controlling the flare point and control the track-width of the write pole, utilizing conventional methods of fabrication, such as ion milling, is problematic. Thus, reducing the width and/or length of the write pole tip may create a magnetic field adjacent to the bit but outside of the track in which the writing process is taking place, thereby corrupting the bits on adjacent tracks. Similarly, it becomes more difficult to simultaneously maintain the planarity of the trailing edge of the write pole as the width and/or length is decreased using an ion mill approach. A reduction in the quality of the trailing edge may reduce the quality of the linear transition between each bit.

Accordingly, what is needed is a write pole structure characterized by a flux field having an improved field gradient to write into high coercivity media while minimizing adjacent track interference (ATI).

SUMMARY OF THE INVENTION

The present invention provides a magnetic write element for perpendicular magnetic recording. The write element includes a magnetic write pole and a wrap around trailing shield. The wrap around trailing shield is constructed of a magnetic material and defines a trailing shield gap between the shield and the trailing edge of the write pole. The shield also defines side shield gaps between the shield and the sides of the write pole. The thickness of the trailing shield gap can be of a different thickness than the side gaps in order to meet different design requirements.

The present invention advantageously allows the trailing shield gap to be constructed of a different thickness (preferably thinner) than the side gaps. The thickness of the trailing shield gap must be tightly controlled in a trailing shield design in order to provide sufficient write field canting to effectively reduce the switching field while not being so thin as to cause excessive flux leakage between the write pole and the trailing shield. The side shields gap, however, need not be as thin as the trailing shield gap and are preferably thicker in order to prevent flux leakage to the side shields.

The trailing edge gap can be constructed of a non-magnetic material having an ion mill rate similar to that of the write pole, for reasons that will become apparent upon further reading of the Detailed Description of the preferred embodiments. Such a material can be for example, NiCr. The side gap can be constructed of a non-magnetic material that can be conformally deposited such as for example, $Al_2O_3$, Ru, Rh or W.

A wrap around trailing shield according to the invention can be a full wrap around shield, wherein the side portions of the shield extend down to a level of the leading edge of the write pole, or can be a partial wrap around shield in which the side portions only extend part way down the sides of the write pole, terminating at a point between the trailing and leading edges of the write pole.

These and other features and advantages of the present invention will become apparent upon reading the Detailed Description of the Preferred Embodiments, taken in conjunction with the Figures in which like element numbers refer to like elements throughout the Figures.

BRIEF DESCRIPTION OF THE DRAWINGS

Embodiments of the present invention are illustrated by way of example and not by way of limitation, in the figures of the accompanying drawings and in which like reference numerals refer to similar elements and in which:

FIGS. 5B-5I illustrate an ABS view of a write pole in various intermediate stages of manufacture;

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the invention, numerous specific details are set forth in order to provide a thorough understanding of the present invention. However, it is understood that the invention may be practiced without these specific details. In other instances, well-known methods, procedures, components, and circuits have not been described in detail as not to unnecessarily obscure aspects of the invention. For example, it is appreciated that the write head is a portion of an integrated read/write perpendicular magnetic recording apparatus. However, embodiments of the present invention pertain to the write head and thus the read head, coil and other conventional structures of the perpendicular magnetic recording apparatus are not described so as not to unnecessarily obscure aspects of the invention.

Embodiments of the present invention provide a novel and manufacturable single-pole write head. The single-pole write head may include a beveled write pole with a leading edge tapering and/or an aggressive flare-point throat height. The single-pole write head may also include a self-aligned side and trailing shield. The embodiments of the present invention and their benefits are further described below.

Figure 1A:
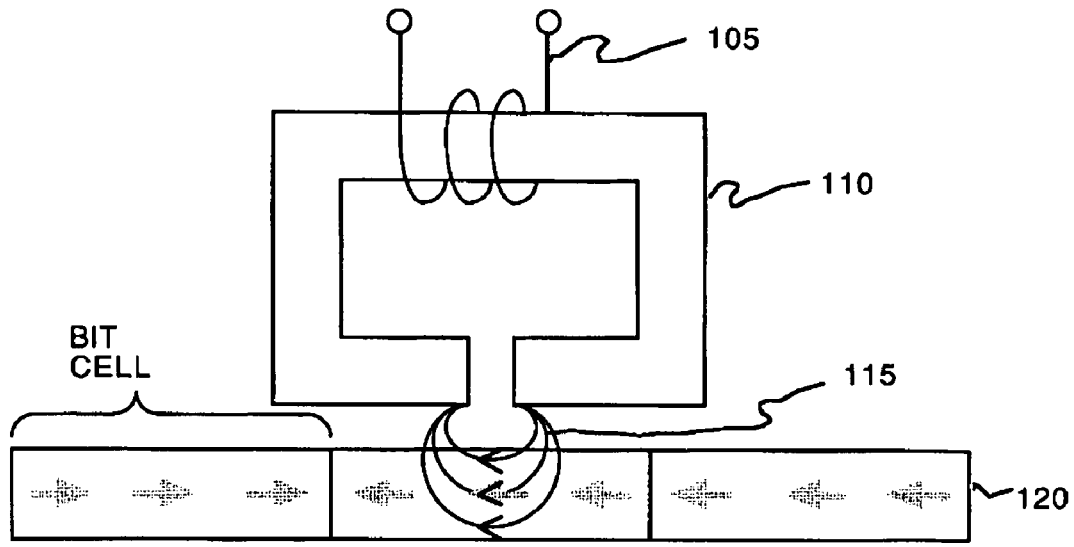
FIG. 1A shows a longitudinal write head, in accordance with the conventional art.
Figure 1B:
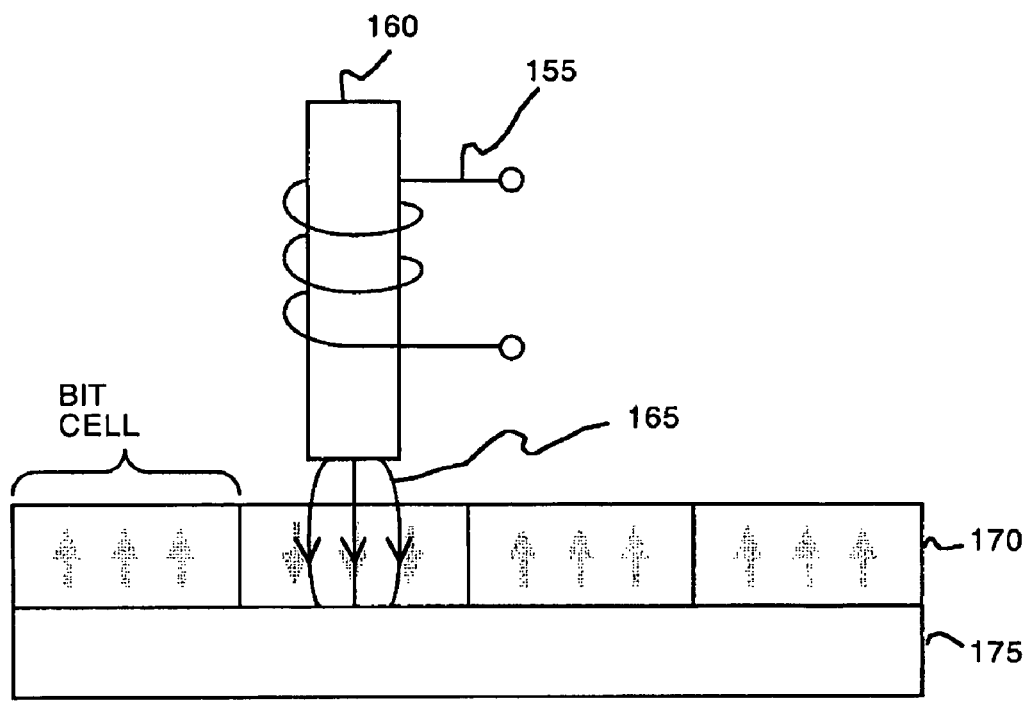
FIG. 1B shows a perpendicular write head, in accordance with the conventional art.
Figure 2A:
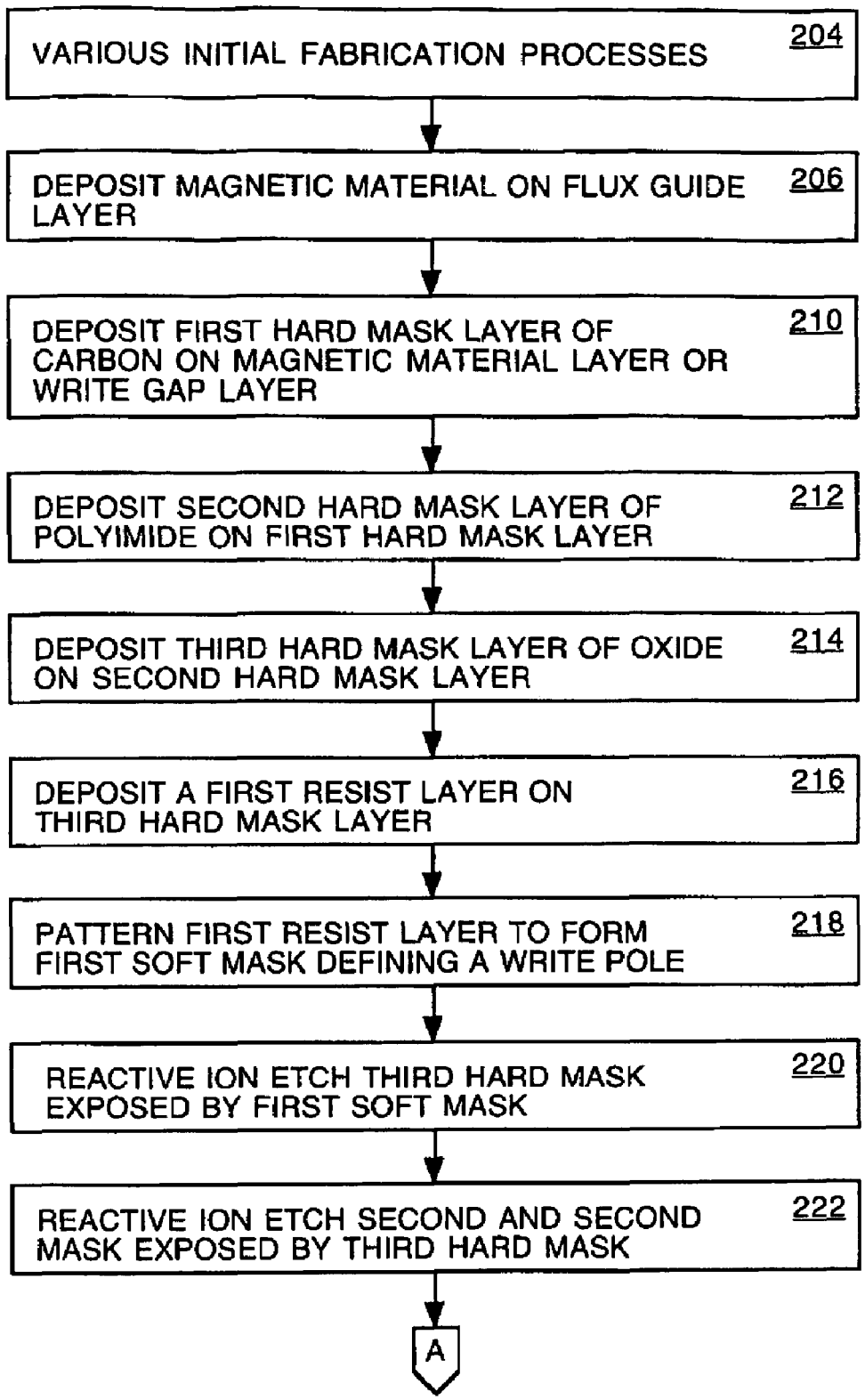
FIGS. 2A, and 2B show a flow diagram of a method of fabricating a write head, in accordance with one embodiment of the present invention.
Figure 2B:
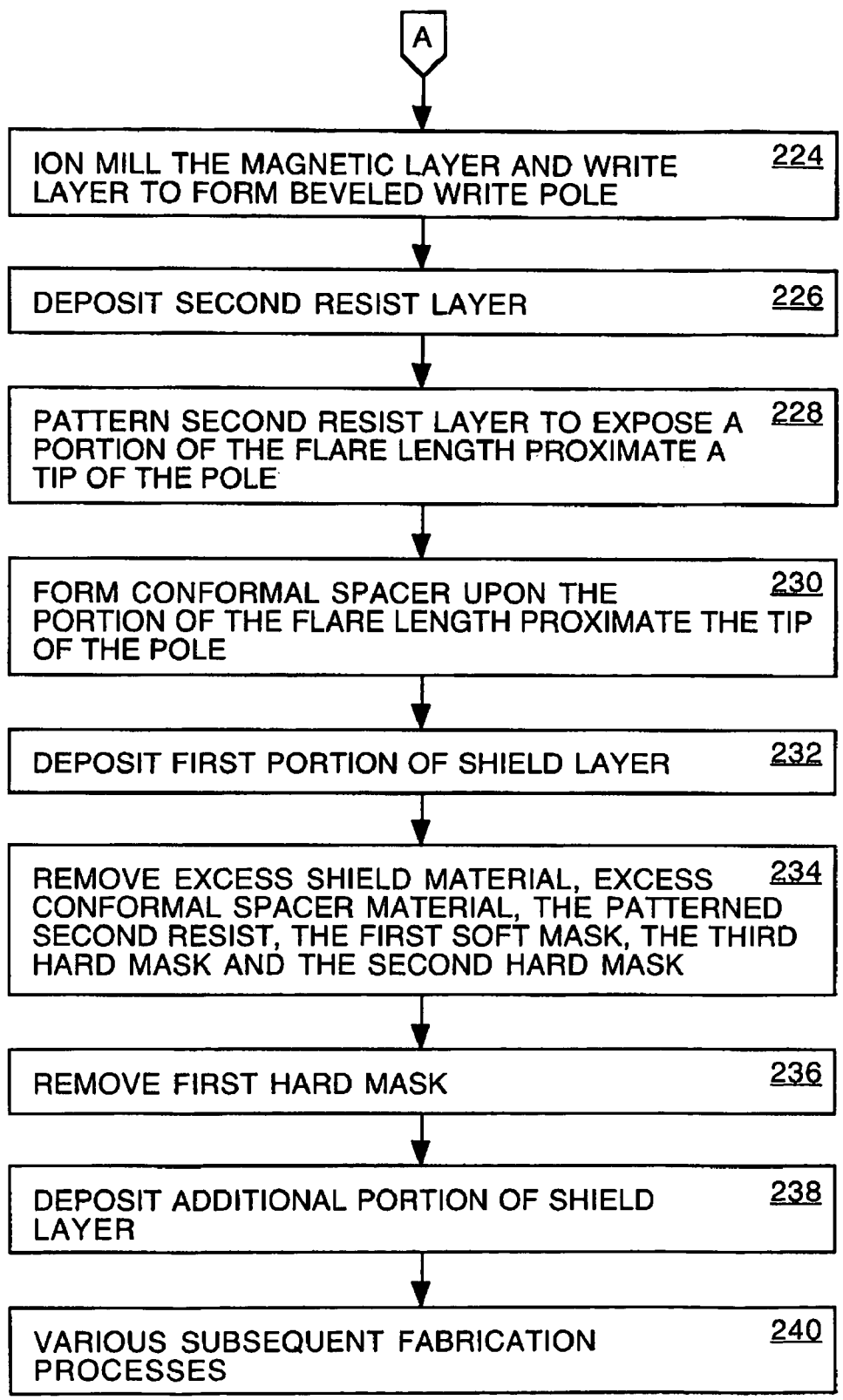
Figure 3A:
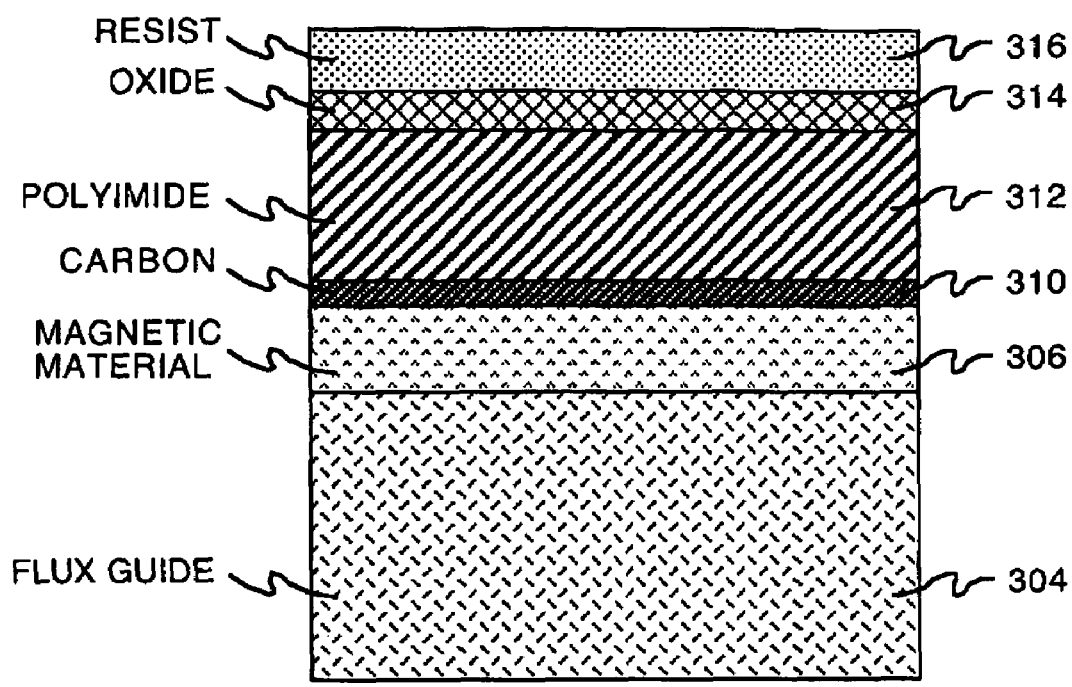
FIGS. 3A, 3B, 3C, 3D, 3E and 3F show block diagrams of a write head during various stages of fabrication, in accordance with one embodiment of the present invention.
Figure 3B:
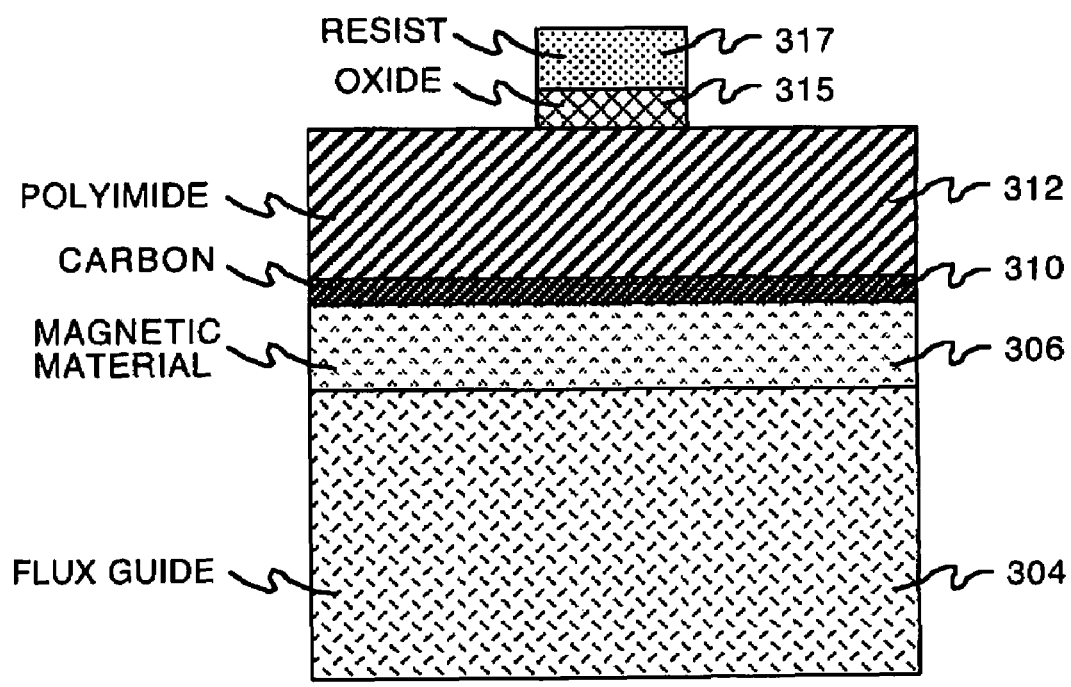
Figure 3C:
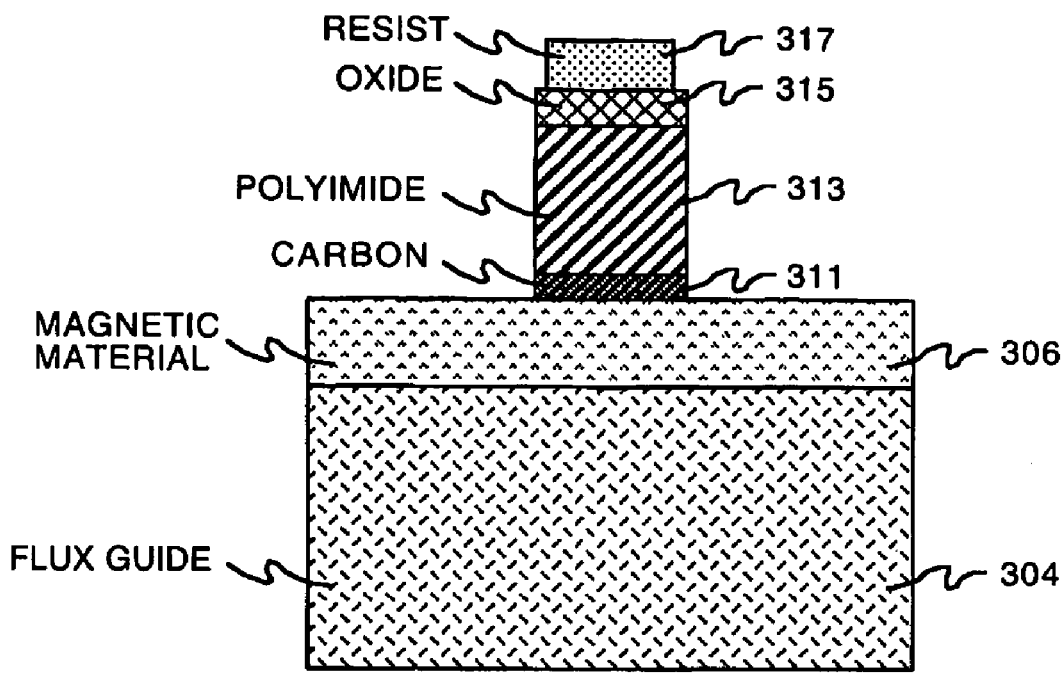
Figure 3D:
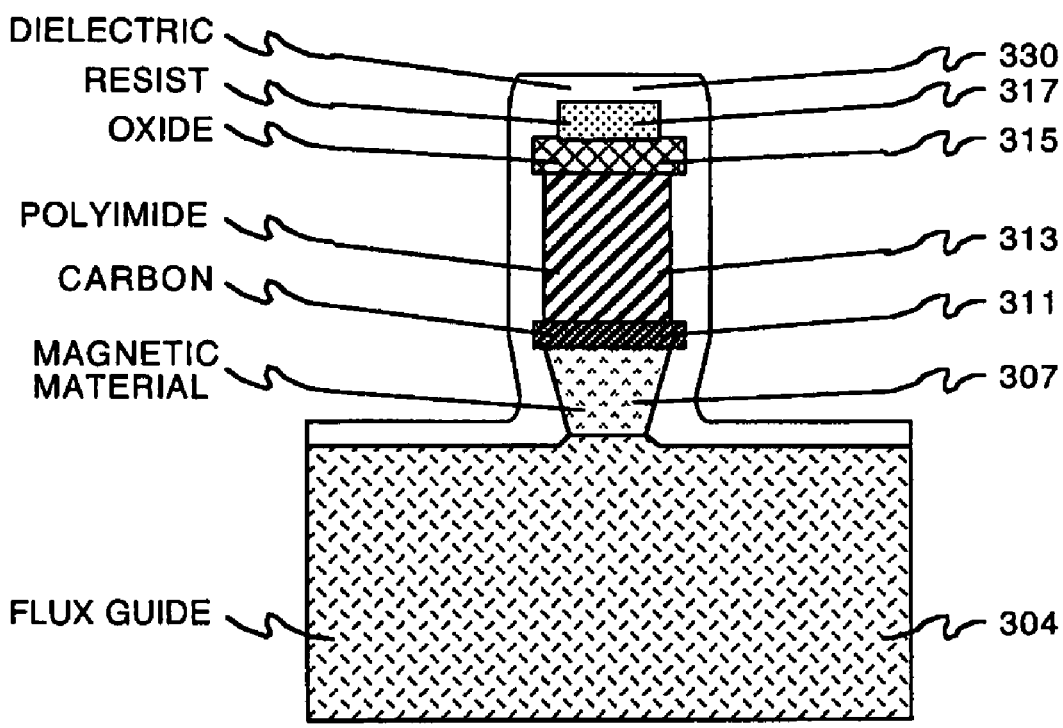
Figure 3E:
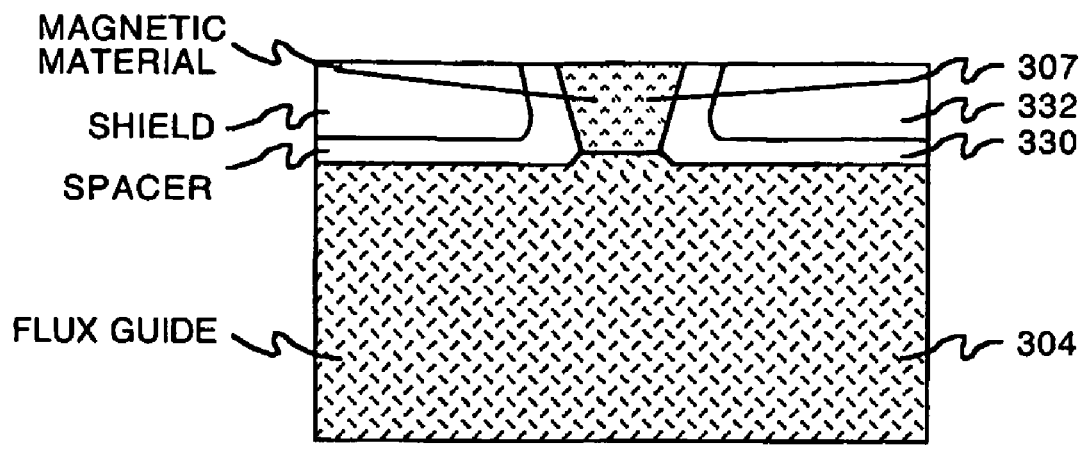
Figure 3F:
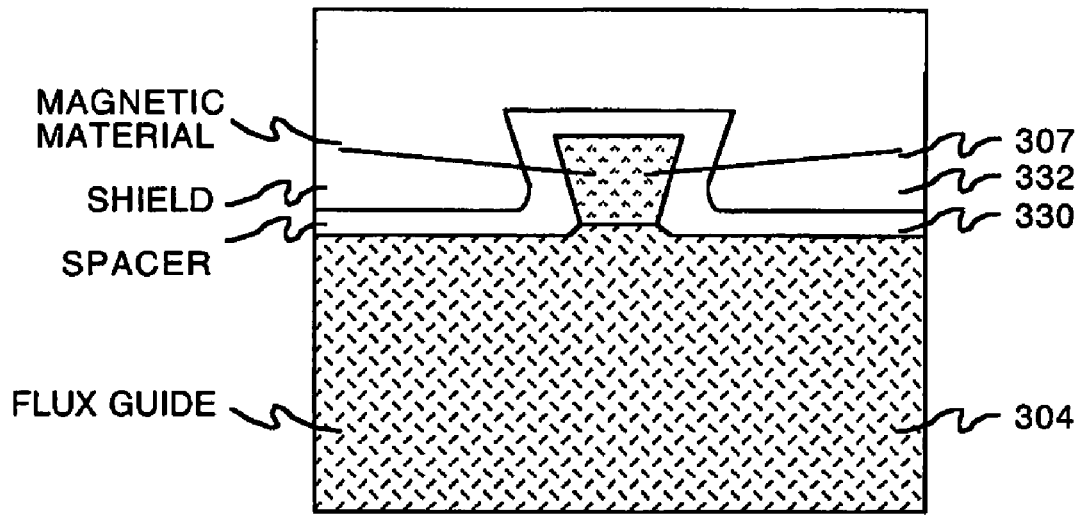

Referring now to FIGS. 2A and 2B, a flow diagram of a method of fabricating a write head, in accordance with one embodiment of the present invention, is shown. The method of fabricating the write head is illustrated in the block diagrams of FIGS. 3A, 3B, 3C, 3D, 3E and 3F. As depicted in FIGS. 2A, 2B, 3A, 3B, 3C, 3D, 3E and 3F, the method includes performing various initial fabrication processes upon a wafer, at 204. In one implementation, the initial fabrication processes may include cleaning, depositing, plating, photolithography, etching and/or the like.

At 206, a layer of magnetic moment material 306 is formed upon a flux guide layer 304. In one implementation, a full-film of laminated high magnetic moment material 306, such as Cobalt (Co), Iron (Fe), Chromium (Cr), Nickel (Ni) or their alloys may be deposited. An exemplary thickness of the laminated high magnetic moment material 306 may be approximately 240-310 nanometers (nm).

At 210, a first hard mask layer 310 having a first etching selectivity is formed upon the layer of magnetic moment material 306. In one implementation, the first hard mask layer 310 may be a CVD deposited layer of carbon. An exemplary thickness of the carbon layer may be approximately 20-35 nm.

At 212, a second hard mask layer 312 having a second etching selectivity is formed upon the first hard mask layer 310. In one implementation, the second hard mask layer 312 may be a spun-on layer of polyimide, such as DURIMIDE available from Arch Chemicals of Norwalk, Conn. An exemplary thickness of the DURIMIDE layer may be approximately 0.8 micrometers ($\mu$m). At 214, a third hard mask layer 314 having a third etching selectivity is formed upon the second hard mask layer 312. In one implementation, the third hard mask layer 314 may be a CVD deposited layer of oxide. An exemplary thickness of the oxide layer may be approximately 100-150 nm.

At 216, a first resist layer 316 is formed upon the third hard mask layer 314. An exemplary thickness of the photo-resist layer 316 may be approximately 0.15-03 $\mu$m. At 218, the first resist layer 316 is patterned to form a first soft mask 317 defining a write head. The defined write head may include a write pole yoke, a write pole flare point, a write pole flare length and optionally a write pole termination pad. In one implementation, any conventional deep ultraviolet lithography or e-beam photolithography process may be utilized to pattern the first soft mask 317.

At 220, a first etching process is performed wherein the portions of the third hard mask layer 314 exposed by the first soft mask 317 are removed. The first etching process transfers the pattern of the first soft mask 317 (e.g., the pattern of the write head) into the third hard mask layer 314 t006F form a third hard mask 315. In one implementation, a fluorine-carbon chemistry based reactive ion etching (RIE) process may be utilized to etch the oxide layer. It is appreciated that selectivity of the first etching process should favor the second hard mask layer over the first soft mask 317.

At 222, a second etching process is performed wherein the portions of the second hard mask layer 312 and the first hard mask layer 310 exposed by the third hard mask 315 are removed. The second etching process transfers the pattern of the third hard mask 315 (e.g., the pattern of the write head) into the second hard mask layer 312 and the first hard mask layer 310 to form a second hard mask 313 and first hard mask 311. In one implementation, an oxygen-carbon chemistry based reactive ion etching process may be utilized to etch the polyimide and carbon layers. It is appreciated the selectivity of the second etching process should favor the first hard mask over the second hard mask. Furthermore, the thickness of the first hard mask may be increased to improve track width control and trailing edge definition (e.g., planarity) control during the second etching process. In another implementation, if the thickness of magnetic moment material layer 306 is sufficiently thin, the third hard mask layer 314 may be omitted and the first etching process 220 may be omitted to simplify the RIE step to one. In this case, the first resist layer 316 should contain silicon (e.g., a silicon containing resist) for better RIE selectivity.

At 224, a third etching process is performed wherein the portions of the layer of magnetic moment material 306 exposed by the first hard mask 311 are removed. In one implementation, an ion milling process may be utilized to etch the layer of magnetic moment material 306 to form the write pole 307. Ion milling may be utilized to bevel the write pole 307 such that the width of the leading edge is less than the width of the trailing edge of the write pole. Iteratively ion milling in a sweeping and rotating configuration enables accurate track width control (e.g., width of the trailing edge) while producing a well-defined flare point of the write head.

It is appreciated that the second hard mask contributes to the patterning of the first hard mask and also offers additional milling resistance to define the write pole during ion milling for improved track width control and trailing edge definition control. The first and second hard mask also enables the ability to extend the ion milling process into the flux guide layer, such that a pedestal is formed.

At 226, a second resist layer is deposited. At 228, the second resist layer is patterned to expose a portion of the flare length proximate a tip of the write pole 307. It should be noted that the second resist layer is also used to lithographically define the pattern and the edge placement of the side and trailing shields. This layer may consist of a bi-layer where the bottom layer is an anti-reflective layer (BARC) such as silicon oxynitride ($SiO_xN_y$) to minimize reflective notching for better critical dimension control. Furthermore, the silicon oxynitride film may optionally be made thicker to define the shield's back edge placement for improved critical dimension control. The patterned second resist layer should cover the yoke portion of the write pole, the flare point of the write pole, a portion of the flare length proximate the flare point and other portions of the write head (not shown). Reactive ion etching (RIE) is used to transfer lithographical patterned resist into the silicon oxynitride layer.

At 230, a conformal spacer 330 is formed upon the portion of the write pole 307 exposed by the patterned second resist layer. The conformal spacer 330 may be a non-magnetic material such as aluminum oxide ($Al_2O_3$), silicon oxide ($SiO_2$), silicon nitride ($Si_3N_4$), tungsten (W), silicon oxynitride ($SiO_xN_y$), tantalum (Ta), Rhodium (Rh), Ruthenium (Ru) or the like. In one implementation, the non-magnetic material may be deposited utilizing atomic layer deposition (ALD), pulsed-atomic layer deposition, low-pressure chemical deposition process (LPCVD), plasma enhanced chemical vapor deposition (PECVD), high-density plasma deposition (HDPD) or similar chemical vapor deposition process. In one implementation, the conformal spacer 328 may be approximately 20-45 nm thick.

At 232, a first portion of a shield layer 332 is deposited. The shield layer 332 may be a plated high magnetic material, such as Nickel Iron (NiFe). In one implementation, the shield layer 332 may be approximately 0.3-1.0 µm thick. The shield layer 332 forms a self-aligned shield proximate the sides of the write pole 307. The conformal spacer 330 is adapted to provide aggressive alignment and spacing between the write pole 307 and the shield 332. It is appreciated that if the third etching process is extended into the flux guide layer (e.g., formation of a pedestal) the conformal spacer 330 may extend below the write pole 307 and therefore the shield layer 332 may wrap the entire sides of the write pole 307.

At 234, the excess shield layer 330 material, excess conformal spacer 328 material, the patterned second resist, the first soft mask 317, the third hard mask 315, and the second hard mask 313 may be removed. In one implementation, the excess shield layer 330 material, excess conformal spacer 328 material, the patterned second resist, the first soft mask 317, the third hard mask 315, and the second hard mask 313 may be removed utilizing a chemical mechanical polishing (CMP) process. The CMP process may be stopped on the first hard mask 311. It is appreciated that the second resist may have a similar material property as the first second and/or third hard mask layers such that the materials have substantially similar CMP rates. Furthermore, the thickness of the first hard mask may be increased to improve track width control and trailing edge definition (e.g., planarity) control during the CMP process.

At 236, a fourth etching process is performed wherein the first hard mask 311 is removed. In one implementation, an oxygen-carbon chemistry based reactive ion etching process may be utilized to etch the first hard mask 311. The fourth etching process result in a highly planar trailing edge of the write pole tip, such that increased transitional sharpness is obtained when writing data to a magnetic disk.

At 240, the fabrication of the write head continues with various subsequent fabrication processes. In one implementation, the subsequent fabrication processes may include cleaning, depositing, etching and/or the like.

It is appreciated that the above-described embodiment may readily be modified to form a single-pole write head having a self-aligned wrap-around side and trailing edge shield. At optional process 208, spacer material layer may be formed upon the layer of magnetic moment material 306. In one implementation, a non-magnetic material, which may be a conductor or an insulator, is deposited. In one implementation, the thickness of the spacer material layer may be approximately 20-45 nm. The third etching process at 224 acts to pattern the spacer material layer to form a trailing edge conformal spacer. It is also appreciated that the conformal spacer formed at 330 combines with the trailing edge conformal spacer to form a wrap-around conformal side and trailing edge spacer.

An optional process 238, an additional shield layer may be formed upon the remaining shield layer 332 and the remaining conformal spacer 330. After CMP, a thin non-magnetic conductive layer, such a tantalum (Ta) or Ruthernium (Ru), may be deposited. This layer serves two purposes: trailing shield gap and seed-layer for plating. Tantalum provides for good adhesion to the write pole, and Ruthenium (Ru) provide for a thin (e.g., 3 nm) plating seed-layer. It is also appreciated that tantalum and Ruthenium do not readily oxidize. The additional shield layer forms a self-aligned shield 332 proximate the trailing edge of the write pole 307, and combines with the remaining first portion of the shield layer to form a wrap-around shield design. In one implementation, the Ta/Ru seed-layer is deposited follow by removal of a portion of the Ta/Ru thin film to expose the conformal spacer 330 for magnetic connection of the conformal spacer 330 to the shield layer 332. This is followed by photolithography utilizing a bi-layer with BARC, such as silicon oxynitride, RIE to remove the silicon oxynitride exposed by the patterned resist, and plating of magnetic material, such as Nickel Iron, to create the trailing edge shield.

In another embodiment, a frame platting process, instead of the above-described laminate process, may be utilized to form the write pole. More specifically, the following processes may be substituted for the above-described processes 204-222 for fabricating the write head. A seed layer, such as nickel iron (NiFe) is sputtered on the flux guide layer. A first photo-resist is deposited upon the seed layer and patterned to roughly define the write pole. The pole piece is then plated in the opening in the first photo-resist layer up to a desired height. The resist is stripped and the un-plated portion of the seed-layer is removed. A second resist layer is deposited and patterned to expose a portion of the flare length proximate a tip of the write pole. A conformal spacer is formed upon the portion of the write pole exposed by the patterned second resist layer. A shield layer is deposited to form either self-aligned side shields or a self-aligned wrap-around side and trailing edge shield. The conformal spacer is adapted to provide aggressive alignment and spacing between the write pole and the shield.

It is appreciated that the above-described embodiments for forming a single-pole write head having self-aligned side shields may be combined with conventional methods of forming a trialing edge shield. Accordingly, a single-pole write head having self-aligned side shields and a separate trailing edge shield.

Figure 4A:
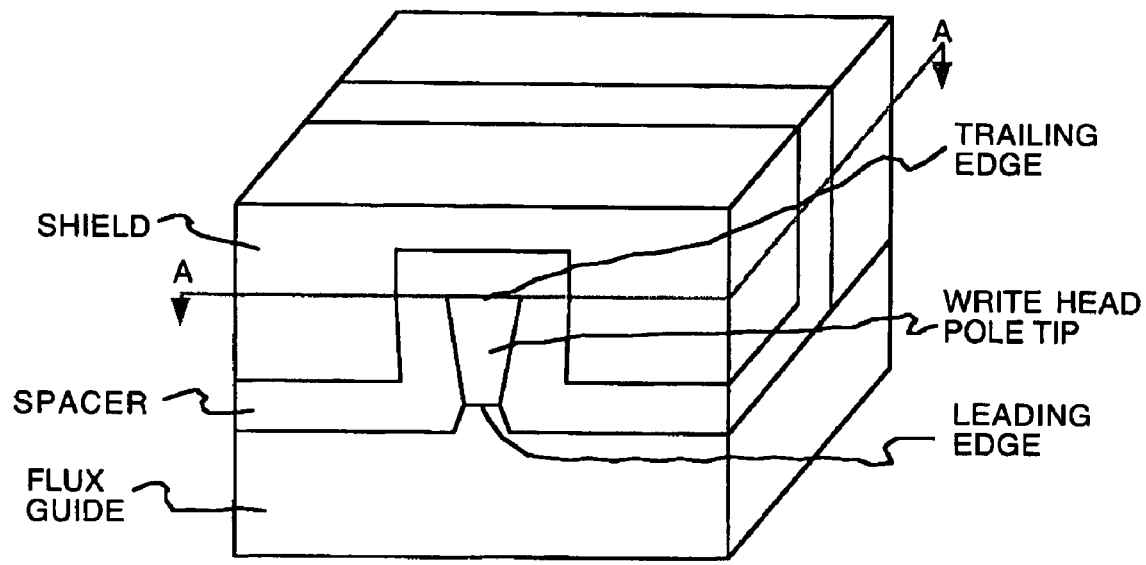
FIGS. 4A and 4B show perspective views of a portion of a perpendicular magnetic write head, in accordance with one embodiment of the present invention.
Figure 4B:
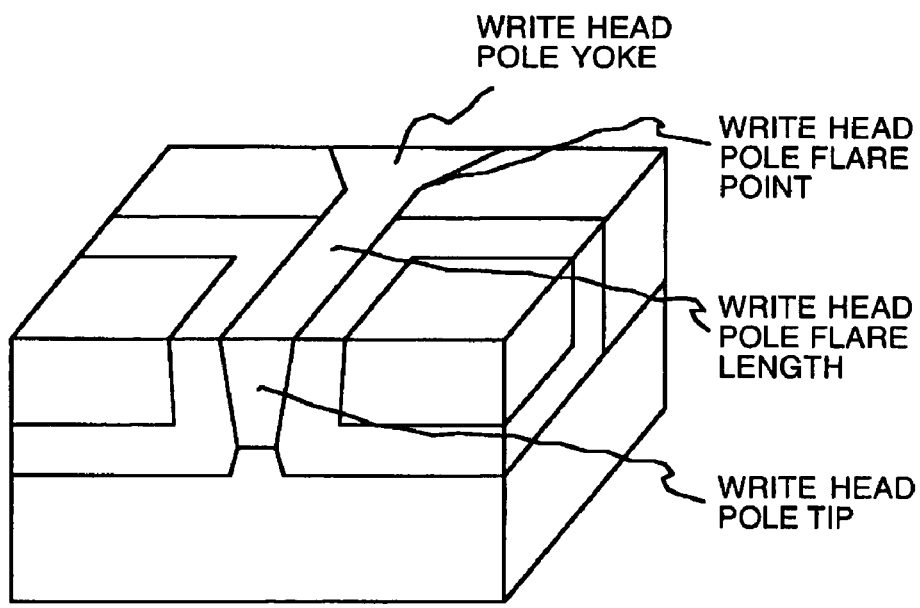

Referring now to FIGS. 4A and 4B, perspective views of a portion of a perpendicular magnetic write head, in accordance with one embodiment of the present invention, is shown. FIG. 4B is a sectional view of the portion of the write head of FIG. 4A along section line A-A. The write head includes a write pole and a shield. The write pole includes a write pole yoke, a write pole flare point and a write pole flare length. The flare length may be beveled such that a tip of the write pole has a leading edge and a trailing edge. An exemplary angle of the bevel may be approximately 5-15 degrees, such that the width at the leading edge is less than the width at the trailing edge. The trapezoidal shape of the write tip minimized adjacent track interference when the write head is skewed at the outer and inner circular tracks of a rotating magnetic disk. In one implementation, the pole may be a high magnetic material such as cobalt (Co), Iron (Fe) or Nickel (Ni) or their alloys.

The shield may be aligned with the side and trailing edges of the write pole. In one implementation, the shield may be a high magnetic material such as Nickel Iron. The shield aligned with the side and trailing edges of the write pole is adapted to achieve a desired effective flux field having an improved field gradient. The portion of the shield aligned with the trailing edge of the write pole is adapted to improve transitional sharpness (e.g., linear resolution) and permit higher coercive field media (e.g., high stability). Improved transitional sharpness and higher coercive field media enables increased areal densities in perpendicular magnetic recording.

In one embodiment, the shield is separated from the write pole by a spacer. In one implementation, the spacer may be a non-magnetic material such as aluminum oxide ($AL_2O_3$), Silicon Oxide ($SiO_2$), Silicon Nitride ($Si_3N_4$), Tungsten (W), ($SiO_xN_y$) or similar material. The spacer provides for aggressive alignment and separation of the side and trailing edges of the shield to the write pole. Alignment and separation of the shield to the side and trailing edges of the write pole by the spacer is adapted to achieve a desired effective flux field having an improved field gradient to write to high coercivity media while minimizing adjacent track interference (ATI).

It is appreciated that the above-described embodiments may readily be modified to provide a single-pole write head having self-aligned side shields, a self-aligned integral wrap-around side and trailing edge shield, or self-aligned side shields and separate trailing edge shield.

Accordingly, embodiments of the present invention advantageously provide a single-pole write head including a beveled write pole with a leading edge tapering and/or an aggressive flare-point throat height. Embodiments of the present invention advantageously provide a single-pole write head including a self-aligned side shields. Embodiments of the present invention may also advantageously provide trailing edge shield. Embodiments of the invention provide a single-pole write head for generating an flux field for perpendicular recording at densities between approximately 100 gigabit per square inch and 1 terabit per square inch or more. The flux field has an improved field gradient for minimizing adjacent track interference. Embodiments of the invention also advantageously provide a manufacturable method of constructing the write head in accordance with embodiments of the present invention.

Figure 5A:
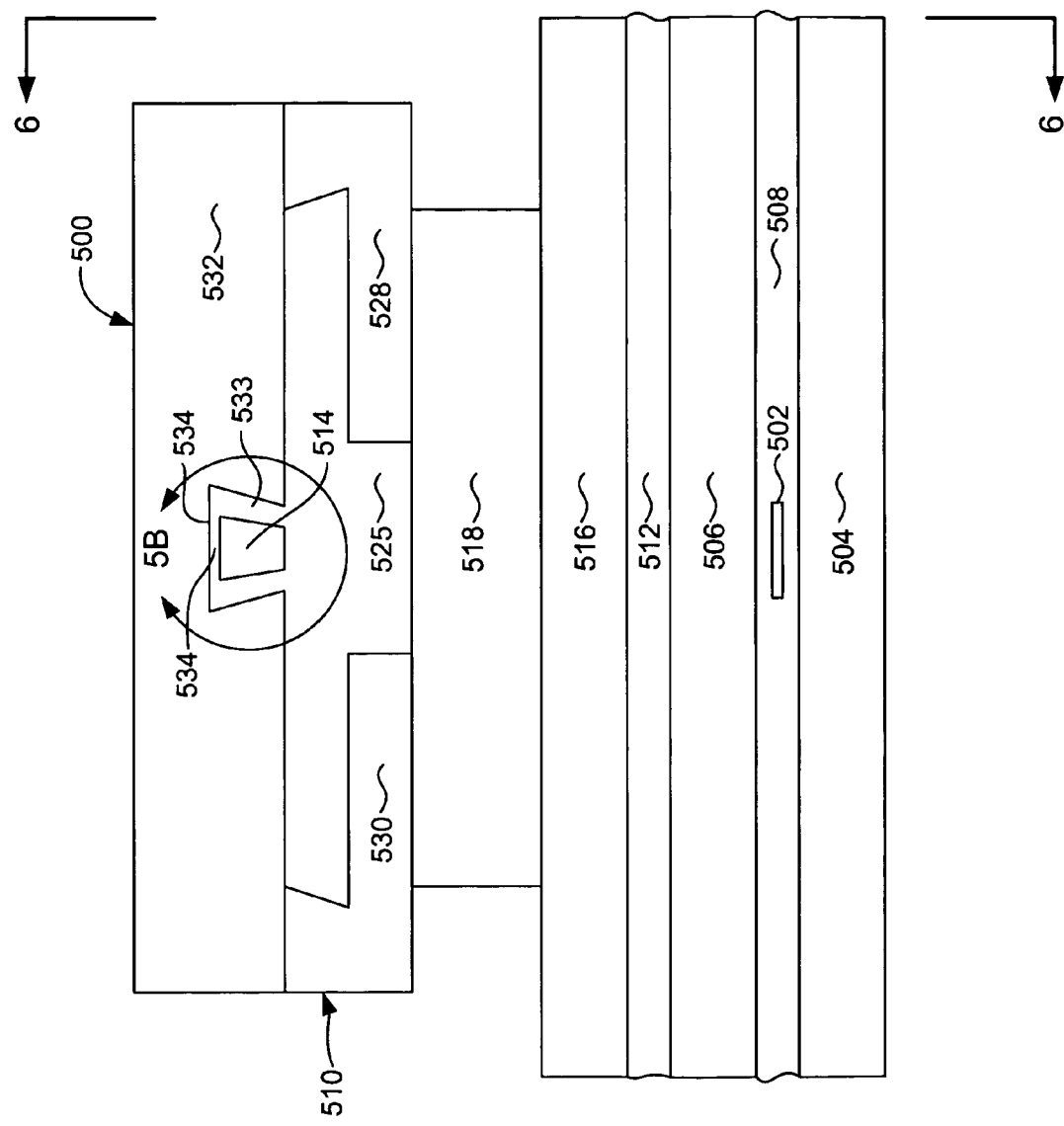
FIG. 5A shows an ABS view of a magnetic head according to an embodiment of the invention.

With reference to FIG. 5A, a magnetic head 500 according to an embodiment of the invention, viewed from the ABS direction, includes a read sensor 502 formed between first and second magnetic shields 504, 506 and embedded in a non magnetic, electrically insulating material 508 such as alumina. The magnetic head 500 also includes a magnetic write element 510 that may be separated from the read sensor 502 and shields 504, 506 by an insulation layer 512, which may be alumina.

The write element 510 includes a write pole 514 and a return pole 516. As can be seen the write pole 514 has a small cross section as viewed from the ABS and preferably extends to the ABS. The return pole 516 has a much larger cross section as viewed from the ABS and also preferably extends to the ABS. A P1P pedestal 518 extends upward from the return pole in the ABS region. A back gap portion 520 connects the return pole 516 with a shaping layer 522 in a region opposite the ABS. The shaping layer is magnetically connected with the write pole 514, but does not extend to the ABS. An electrically conductive coil 524 passes through the yoke formed between the shaping layer 522 and write pole 514 and the return pole 516. The coil 524 is embedded in an insulation layer 526. Non-magnetic, electrically conductive gap material 525 fills the space between the trailing shield and pedestal portions 518, 528, 530 in the region near the ABS and also fills the space between the write pole 514 and trailing shield 532.

First and second wing shaped pedestal extensions 528, 530 extend from either lateral side of the P1P pedestal 518. The pedestal extensions magnetically connect the P1P pedestal with a trailing shield 532. The construction of the P1P pedestal 518, pedestal extensions 528, 530 and other structures is described in commonly assigned patent application Ser. No. 11/116,796, which is incorporated herein by reference.

The return pole 516, pedestal 518, back gap 520, shaping layer 522, pedestal extensions 528, 530, write pole 514 and trailing shield can all be constructed of one or more magnetic materials, such as CoFe, NiFe or some other magnetic material. As can be seen in FIG. 5A, the trailing shield 532 wraps around, the write pole to provide side shielding as well as trailing shielding. The shield 532, therefore, defines a trailing shield gap 531 at the trailing edge of the write pole 514 and also defines side shield gaps 533 at either side of the trailing shield. The trailing shield gap 531 is preferably constructed of a material having an ion mill rate similar to that of the write pole 514. Such a material could be for example NiCr. The side shield gaps 533 could be the same material as the trailing shield gap 531, but are more preferably constructed of a non-magnetic material that can be conformally deposited, such as by atomic layer deposition (ALD) pulsed ALD, LPCVD, PECVD or several other variants of CVD. Such a material could be for example $Al_2O_3$, W, Ta, Cr, Au, Rh and many other metals and compounds which are electrically insulating or metallic.

The purpose of the side or wrap around portion of the shield is different from that of the trailing portion, and therefore requires different gap spacing spacing. As discussed above, the purpose of the trailing shield is to reduce the switching field. The size of the trailing shield gap 531 is the distance between the write pole 514 and the nearest trailing edge 534 of the trailing shield 532. This distance should be tightly controlled. To small of a gap 531 will result in too much flux leakage to the trailing shield 532 and will result in reduced writer performance. To large of a gap 531 will not provide sufficient canting of magnetic field to effectively improve the switching field.

The wrap around portions of the trailing shield 532 (those that extend down at the sides of the write head 514) prevent the write pole from writing to adjacent tracks. The side gap or wrap around trailing shield gap should be large enough to prevent writing to adjacent tracks, but should not so small as to cause flux leakage to the wrap around portions of the trailing shield 532. Generally, the side gaps 533 are preferably larger than the trailing shield gap 531. Preferably, the side shield gap 533 is about 2 times the thickness of the trailing shield gap. For example, the side shield gap may be 1.5 to 2.5 times the thickness of the trailing shield gap. The size of the trailing shield gap and side gap are affected by factors such as magnetic spacing (fly-height), media, areal density, and head design.

The wrap around shield 532, may extend downward to have a leading edge that is essentially coplanar with the leading edge of the write pole as shown in FIG. 5. Alternatively however, the wrap around shield 532 could extend downward beyond the leading edge of the write pole 514 or could stop short of the leading edge of the write pole. The decision as to what configuration the wrap around shield 532 should take depends on various design consideration. For example, if there is concern that excessive write field will be lost to the side portions of the shield 532, then the shield 532 can be constructed to extend only part way down to the leading edge of the write pole 514. If, on the other hand, greater shielding is needed to avoid stray field writing, the shield 532 can be constructed to extend beyond the leading edge of the write pole 532.

Figure 8:
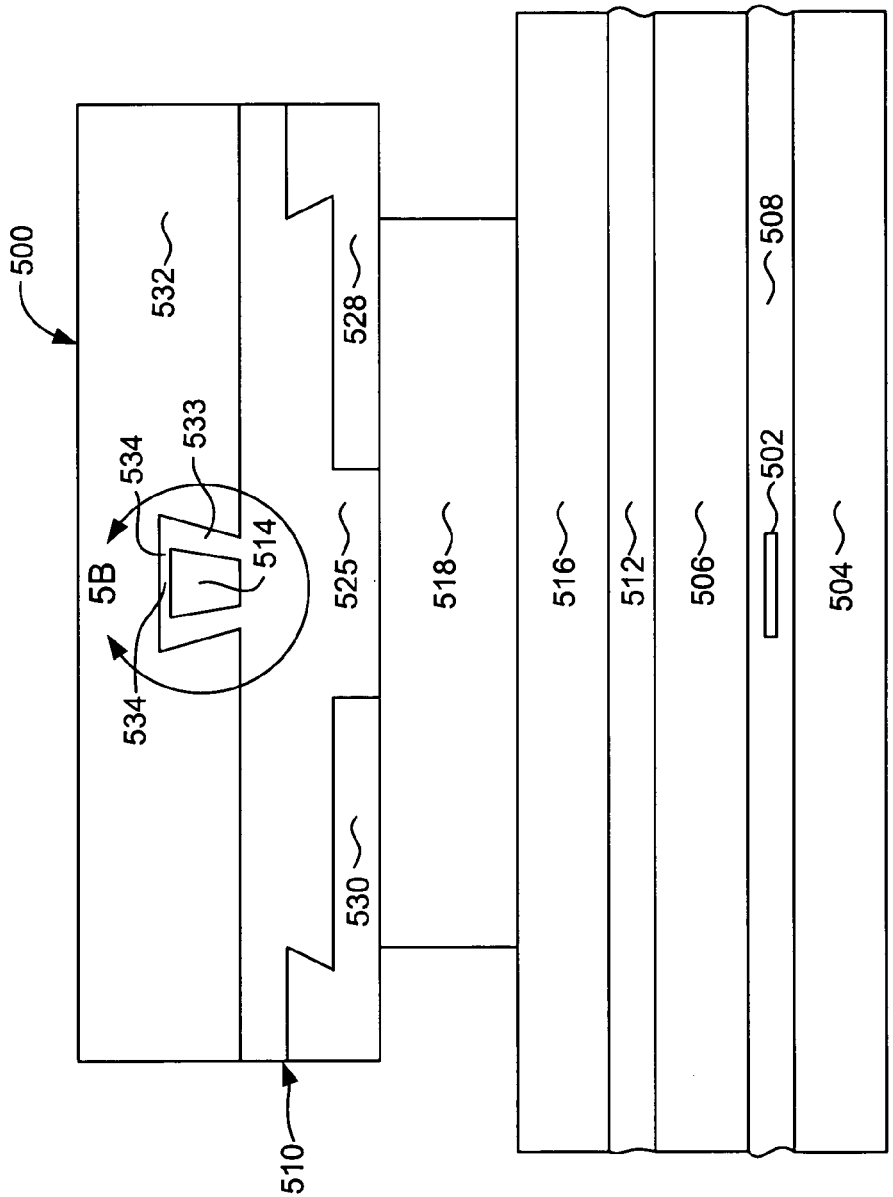
FIG. 8 illustrates an ABS view of a write pole according to yet another embodiment of the invention.

With reference to FIG. 8, an alternate embodiment of a magnetic head 800, includes a floating trailing wrap around trailing shield 802. The shield 802 is not magnetically connected with the pedestal 518 or return pole 516. The shield 802 can be separated from the other magnetic structures 528, 530 518, 516 by a layer of non-magnetic material such as, for example, alumina ($Al_2O_3$).

Figure 5B:
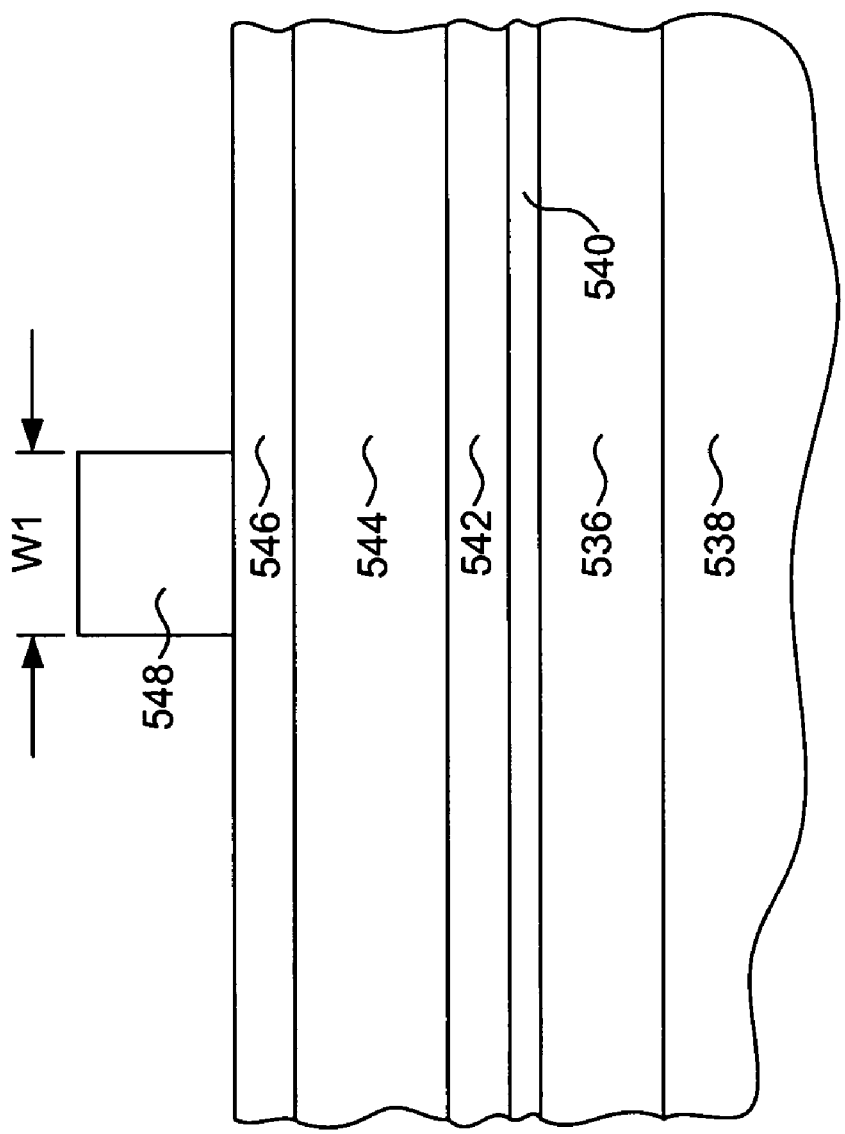

The present invention provides a method for constructing a wrap around trailing shield having side gap 533 thicknesses that are different from the trailing shield gap 531 thicknesses. With reference now to FIG. 5B a full film layer of write pole material 536 is deposited on a substrate 538. The substrate may be a combination of non-magnetic electrically insulating material 525 near the ABS and magnetic shaping layer 522 remote from the ABS. The full film layer of write pole material 536 is preferably a laminated structure of magnetic layers interspersed with layers of non-magnetic material, but could also be a single layer of magnetic material. The full film layer of write pole material 536 preferably includes layers of NiFe or CoFe separated by layers of Cr, Ru, NiCr or $Al_2O_3$.

With continued reference to FIG. 5B, a layer of non-magnetic trailing shield gap material 540 is deposited over the write pole material 536. The write pole material 536 will ultimately become the write pole 514, and the write gap material 540 will ultimately become the trailing shield gap 531. Therefore, the thickness of this trailing shield gap material 540 ultimately determines the thickness of the trailing shield gap 531 in the finished magnetic head 500. Since this gap material 540 is deposited over a smooth, planar, full film write gap material layer 536, the thickness of the trailing shield gap layer can be carefully controlled.

As mentioned above, the trailing shield gap 540 is preferably constructed of a material having the same ion mill rate as the write pole layers 536. The trailing shield gap can, therefore, be constructed of, for example, NiCr. A combination of the magnetic spacing (fly-height), media areal density, and head design influence the trailing shield and side shield gaps.

A layer of material that is resistant to removal by chemical mechanical polishing (CMP stop) 542 is then deposited over the trailing shield gap material. The CMP stop may be for example diamond like carbon (DLC). A hard mask or antireflective coating 544 such as DURAMIDE® or other suitable material is then deposited over the CMP stop 542. A second hard mask 546 such as $SiO_2$, $Si_3N_4$, $SiO_xN_y$ or $Ta_2O_5$ is then deposited over the first hard mask layer 544. It should be pointed out that in some situations, a single hard mask layer may be desired, although the dual mask structure described above is believed to be the best embodiment presently contemplated. A photoresist mask 548 is then formed over the hard mask layers 544, 546. The photoresist is photolithographically patterned to have a desired width W1 to form a desired write pole structure, as will be seen.

Figure 5C:
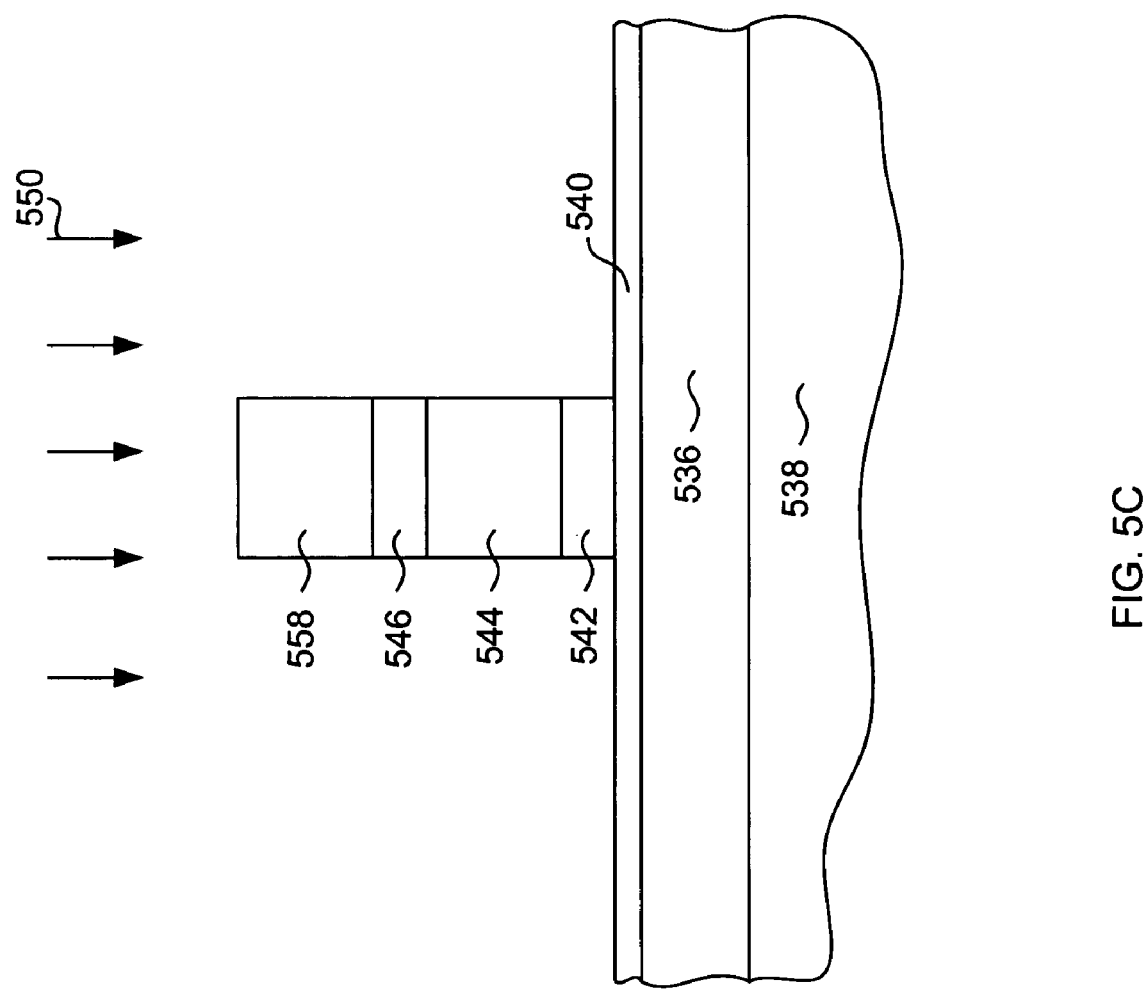

With reference now to FIG. 5C a reactive ion etch RIE 550 is performed to transfer the image of the photoresist mask 548 into the hard mask layers 546, 544. The RIE process 550 is preferably a two step RIE process. The first step includes a RIE using a Fluorine chemistry to transfer the image of the photoresist mask into the first and second mask layer 546, 548. A second RIE is then performed with an oxygen or $CO_2$ chemistry to transfer the image of the photoresist mask 548 and hard masks 544, 546 into the CMP stop layer (DLC) 542.

Figure 5D:
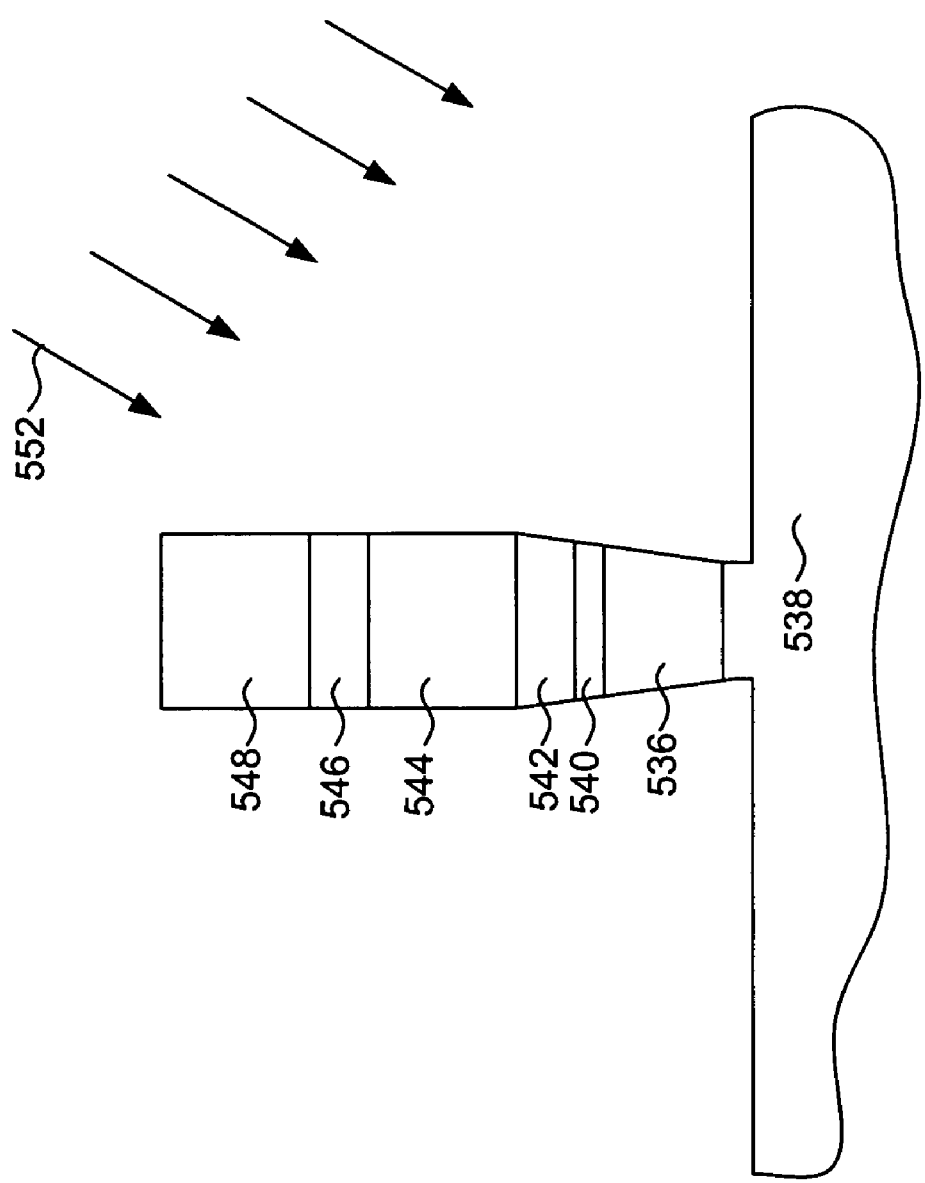

With reference now to FIG. 5D, an ion mill 552 is performed to remove selected portions of the write pole material 536 and trailing shield gap layer 540. The ion mill 552 is preferably performed at an angle with respect to a normal to the planes of the deposited layers 536, 540, 542, 544, 546, 548. In this way, the ion mill can form a write pole having a desired trapezoidal shape to avoid adjacent track writing due to skew. The hard mask material selection may be adjusted for higher selectivity during the ion mill 552 to ensure desired relative mill rates of the mask layers 544, 546. The ion mill 552 may be performed slightly into the underlying substrate 538.

As shown in FIGS. 5A-5I, the ion mill can be performed into the substrate to a depth that is essentially equal to the thickness of the side gap material that will be deposited and described herein below. Ion milling to this depth within the substrate results in a wrap around shield that extends down to such a level that the leading edge of the shield 532 will be essentially coplanar with the leading edge of the write pole 514 as described above. If it is desired that the sides of the wrap around shield 532 should extend down beyond the leading edge of the write pole 514, then the ion mill can be performed sufficiently to mill into the substrate a distance greater than the thickness of the side shield material. Alternatively, if it is desired that the sides of the shield 532 terminate at a leading edge that is above (short of) the leading edge of the write pole 514, then the ion mill can be performed to mill into the substrate a distance less than the thickness of the side gap material or not into the substrate at all.

With reference now to FIG. 5E a layer of side shield gap material 554 is deposited. The side shield gap layer, which may be for example alumina $Al_2O_3$, Ru, Rh, Ta, Au, Cr, W or some other non-magnetic material is preferably deposited by conformal deposition process such as ion beam deposition IBD atomic layer deposition ALD, pulsed-ALD, LPCVD, PECVD or some other variant of CVD. The thickness of the deposited side shield gap material 554 determines the side shield gap in the finished magnetic head 300. This thickness of the side shield gap is preferably thicker than that of the trailing shield gap material 540, and as can be seen the trailing shield gap material 540 and side shield gap material 554 can be different materials. After depositing the side shield material layer 554, additional photo and etch steps may be performed to open up desired electrical connections (not shown).

Figure 5F:
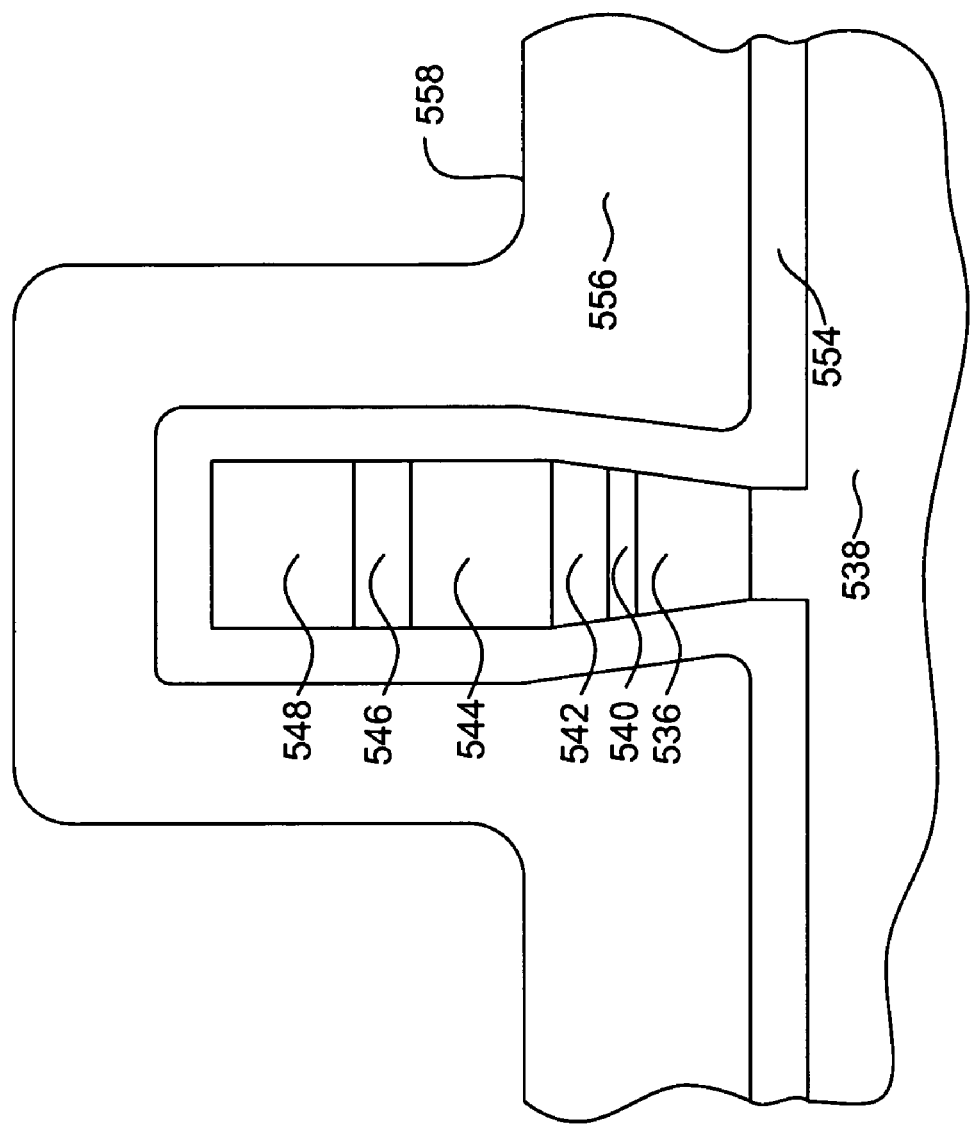

With reference now to FIG. 5F a layer of RIEable material (material susceptible to removal by reactive ion etching) is deposited. The RIEable layer 556 is preferably deposited to a thickness or height 558 slightly above the top of the write pole layer 536 and trailing shield gap layer 540. The RIEable layer material 556 may be constructed of, for example, $Si_3N_4$, $SiO_2$, $Ta_2O_5$ or $SiO_xN_y$.

Figure 5G:
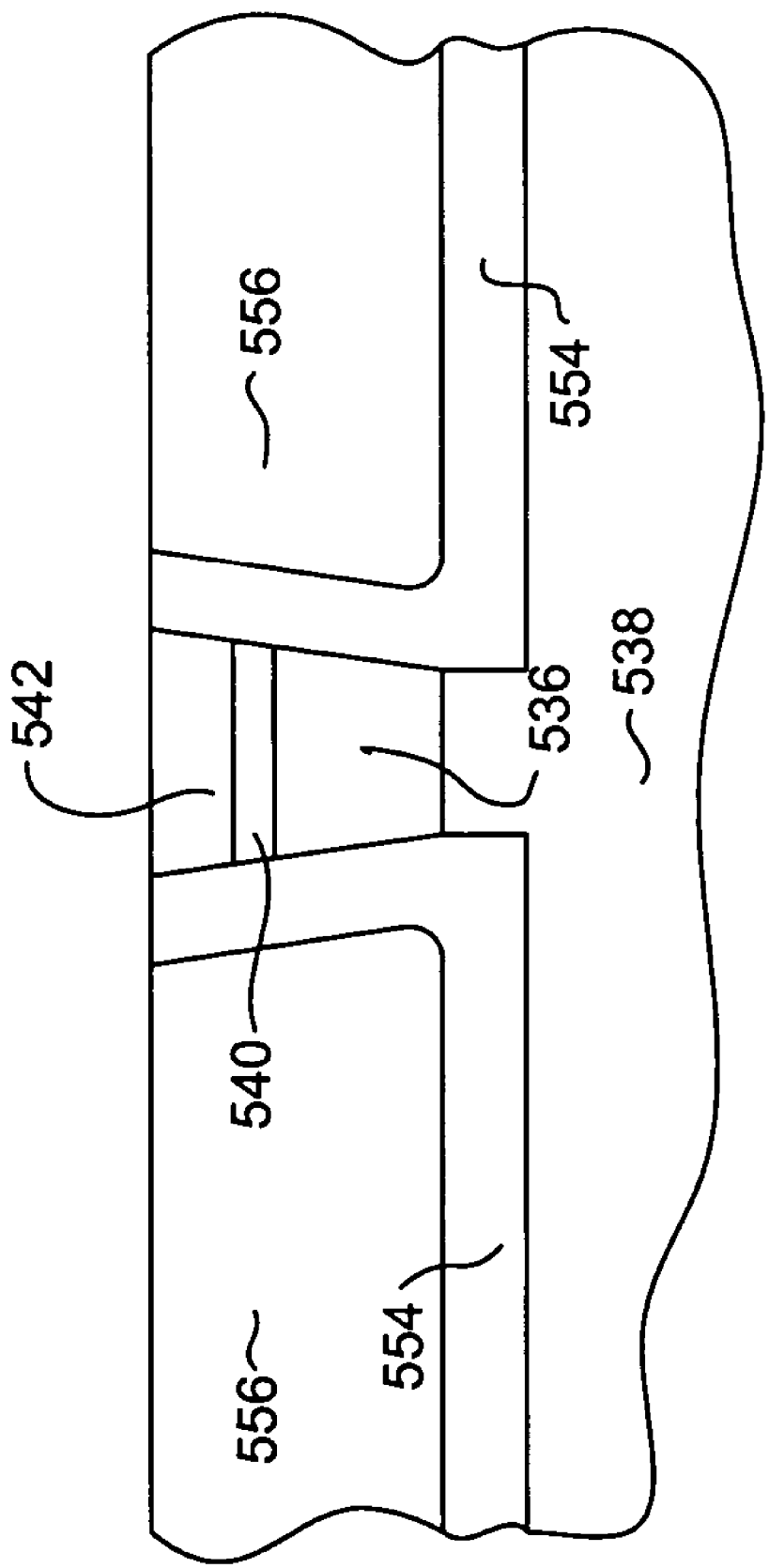
Figure 5H:
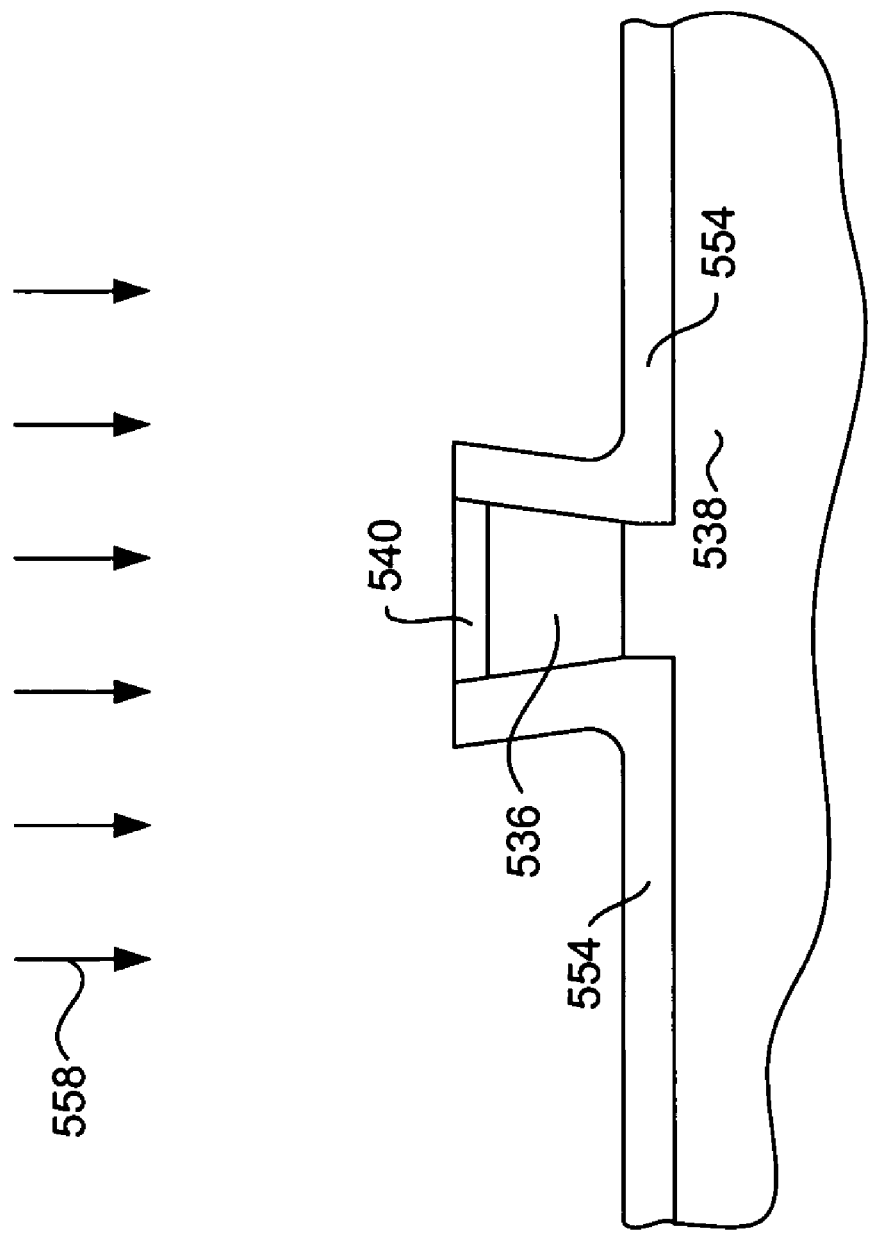

With reference now to FIG. 5G a chemical mechanical polish (CMP) is performed to remove the various mask layers 544, 546, 548 and the side gap and RIEable layers 554, 556, stopping the CMP at the CMP stop layer 542. The presence of the RIEable layer 556 provides structural support and prevents the CMP from completely removing the write pole material 536 and trailing shield gap. A reactive ion etch (RIE) can be used to remove the remaining CMP stop layer 542. Thereafter, with reference to FIG. 5H, a reactive ion etch (RIE) is performed to remove the RIEable material 556 (FIG. 5G). The present embodiment of the invention preferably includes the RIE removal of all of the RIE able material down to the level of the gap material 554.

Figure 5I:
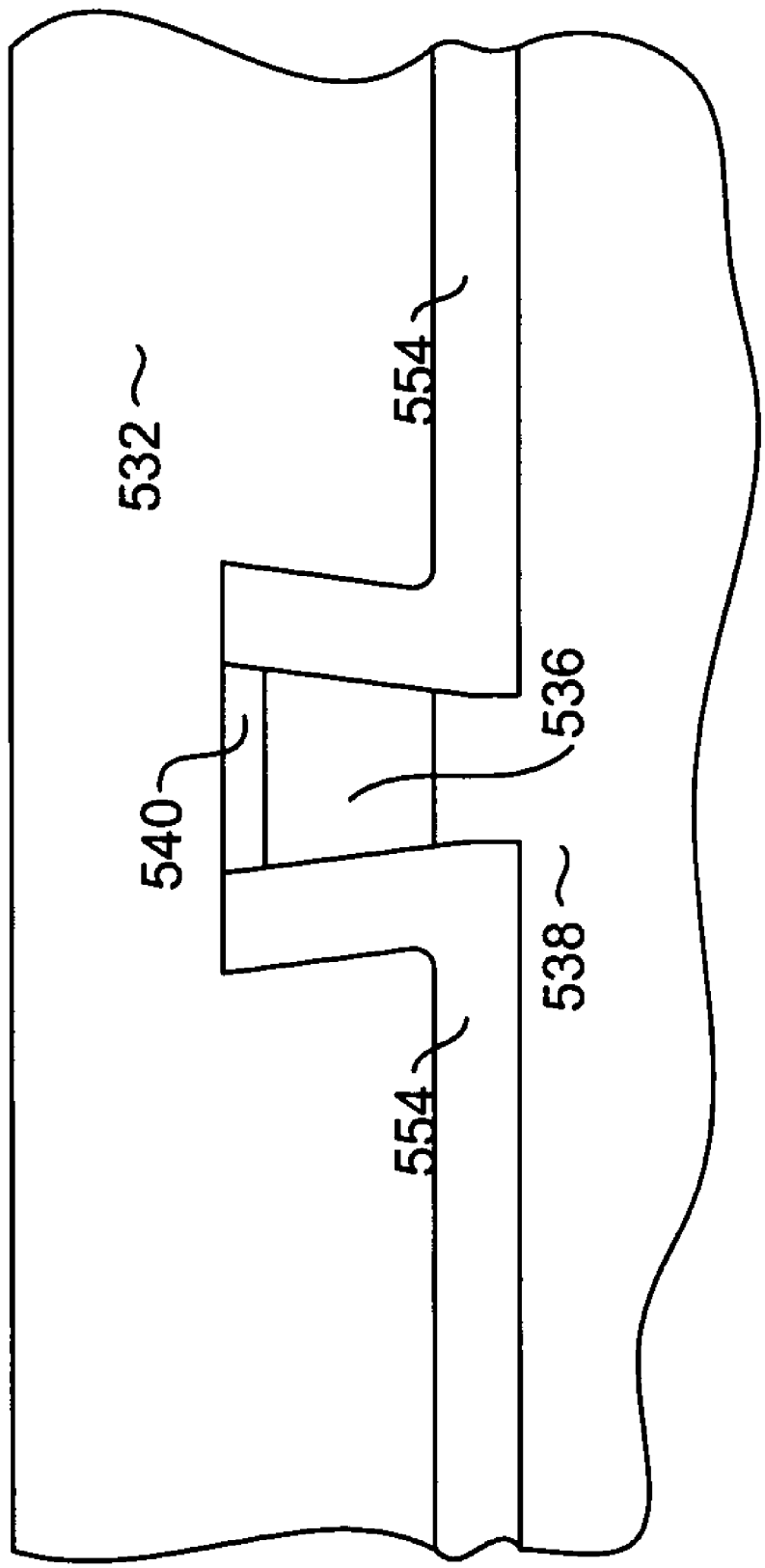
Figure 6:
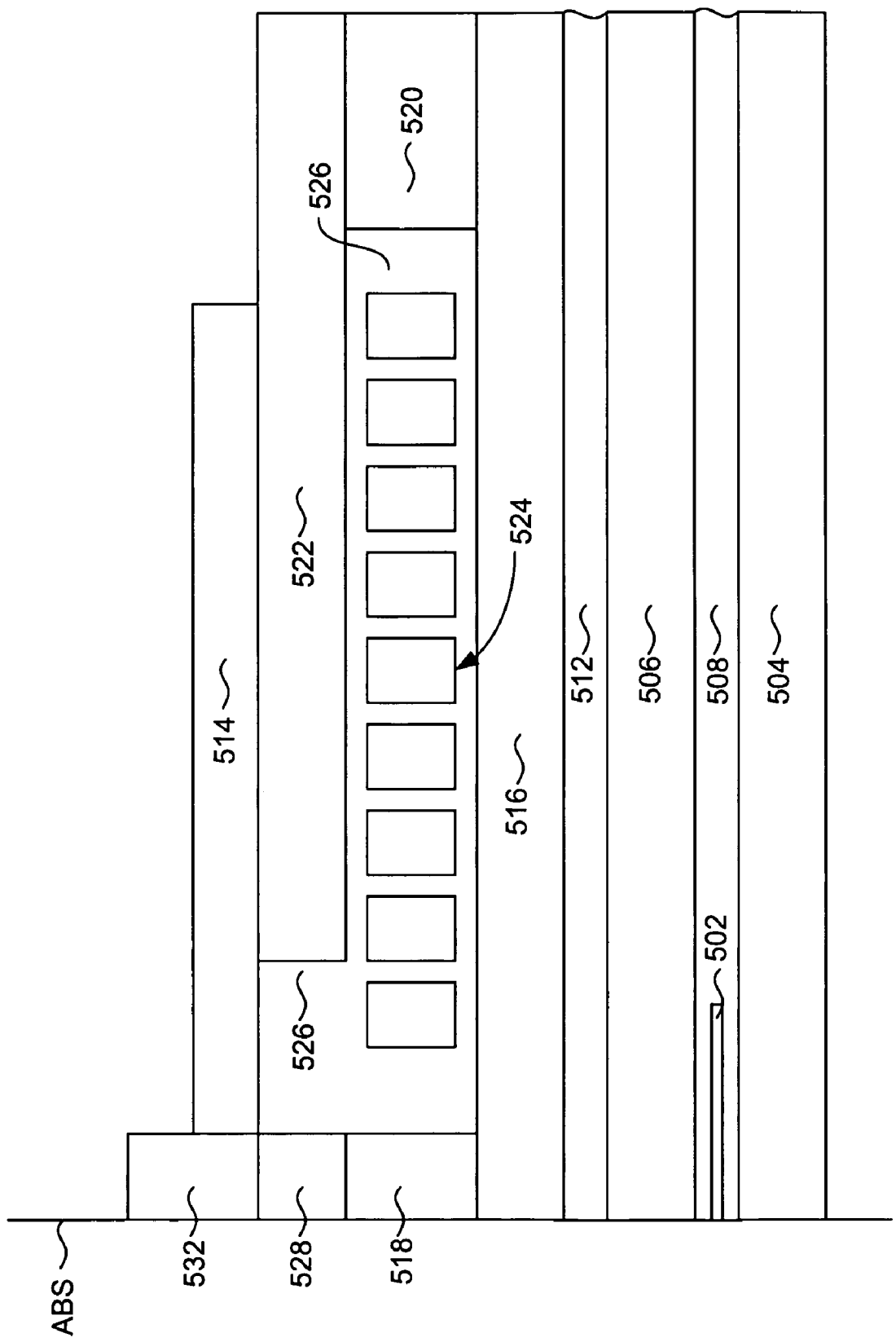
FIG. 6 illustrates a side view of a magnetic head, taken from line 6-6 of FIG. 5.

With reference now to FIG. 5I, the wrap-around shield 532 can be formed. There are two approaches: deposition or plating. For the plating process, the side gap should be a non-magnetic and conductive material such as Ta/Rh or Cr/Au. Since there is a lot of topography, we need to use an effective BARC that is conformal to the write pole structure. Such material is SiOxNy (inorganic BARC) where we can adjust N and K (optical constants) at the exposure tool wavelength (in this case 248 or 193 nm) to minimize reflective notching (or light scattering due to topography). Since SiOxNy is deposited by PECVD or some dry method, it will be conformal. First, the outer edges of the shield 532 are defined by forming a photoresist mask (not shown). A RIE may be performed to remove an antireflective coating necessary for the formation of the outer edge defining photolithographic mask. Then the wrap-around shield is plated. Since the placement of the outer edges of this shield is critical, by using a non-magnetic and conductive seed-layer for the side gap, there is no etch step to remove the seed-layer. The outer shield's placement is optimized—no need to etch to cause shifts of the outer edges of the shield. If the side gap thickness and degree of conformality are critical, deposition using atomic layer deposition (ALD) pulsed ALD, LPCVD, PECVD or several other variants of CVD is required. Currently ALD with alumina allows tight control of thickness and high degree of comformality. With a non-magnetic and non-conductive side gap, deposition is the method to create wrap-around shield. In this case, after deposition of the side gap, First, the outer edges of the shield 532 are defined by forming a photoresist mask (not shown). A RIE may be performed to remove an antireflective coating necessary for the formation of the outer edge defining photolithographic mask. Then the wrap-around shield is deposited and lift-off. Optional is to do CMP after deposition to expose the resist then to RIE/strip to remove the resist.

Figure 7A:
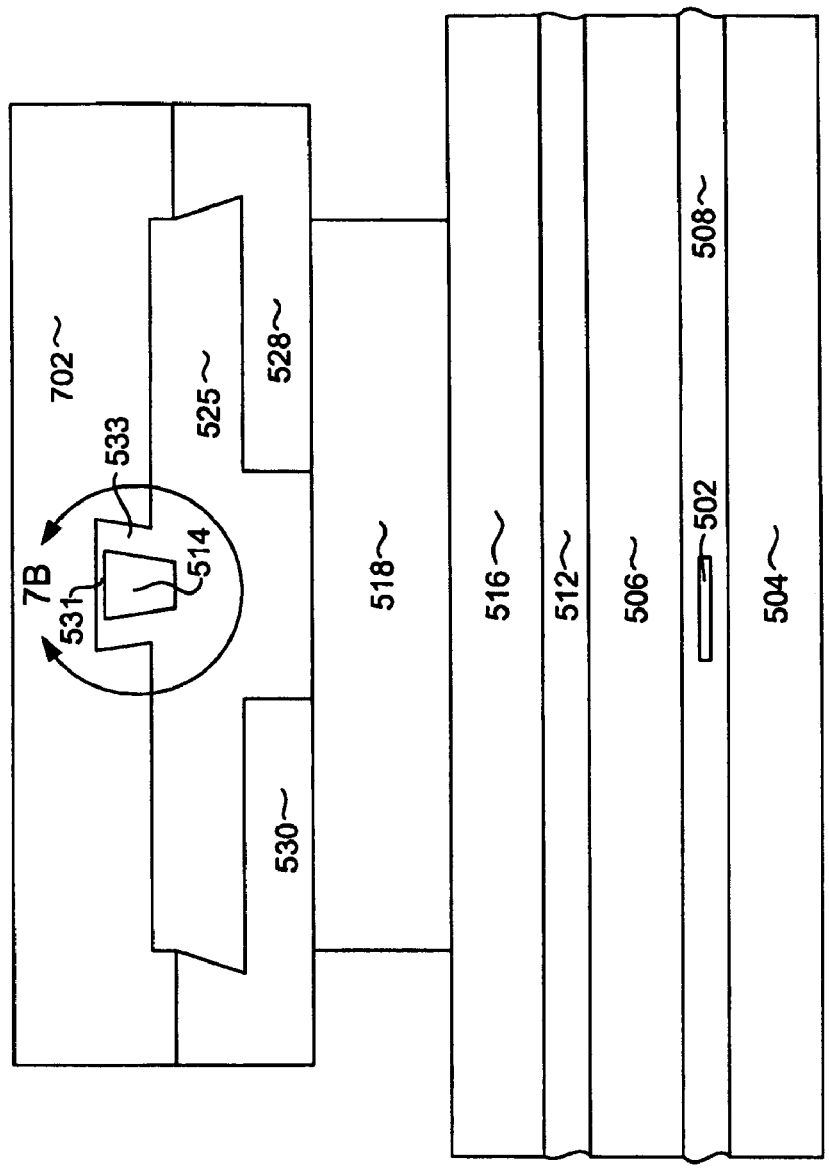
FIG. 7A illustrates an ABS view of a magnetic head according to another embodiment of the invention.

With reference now to FIG. 7A, an alternate embodiment of the present invention includes a partial wrap around trailing shield 702. The partial wrap around trialing shield 702 has side shield portions that extend only part way down the sides of the write pole 514. As with the previously described embodiment, the trailing shield 702 defines a trailing shield gap 531 that can be different from (and preferably smaller than) the wrap around side shield gap 533. The partial wrap around trailing shield 702 may be advantageous in that it reduces flux leakage while also providing a desired amount of side shielding. Since the track width is defined by the width of the widest portion of the write pole 514 at the top of the write pole 514, the wrap around portion of the shield 702 can effectively maintain track width definition (preventing adjacent track writing) while still reducing flux leakage to the sides of the shield 702. In this alternate embodiment of the invention, the side portions of the trailing shield can extend from the trailing edge toward the leading edge of the write pole by any desired distance. For example the side portions may extend a distance of between one fourth and three fourths the distance between the trailing edge and the leading edge. The side portions could also extend about half way between the trailing edge and the leading edge.

Figure 7B:
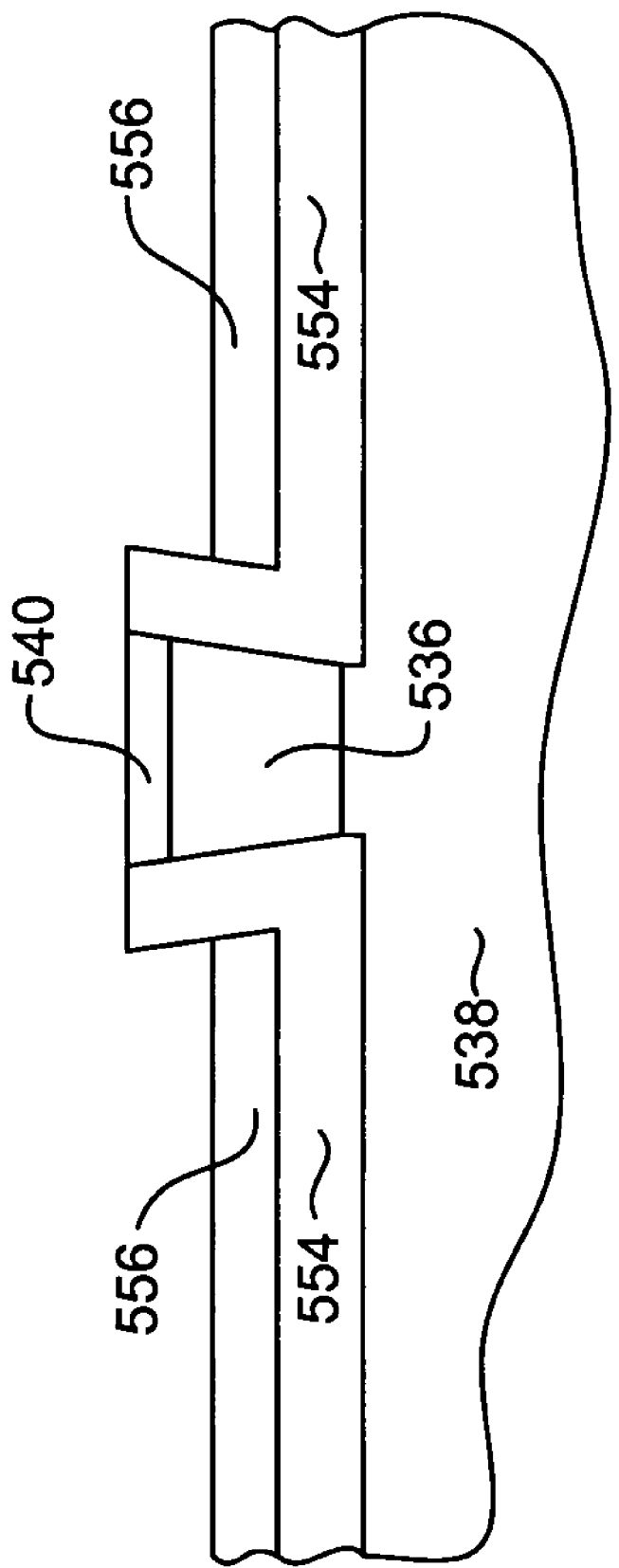
FIGS. 7B-7C illustrate an ABS view of a write pole according to an alternate embodiment of the invention, shown in intermediate stages of manufacture.
Figure 7C:
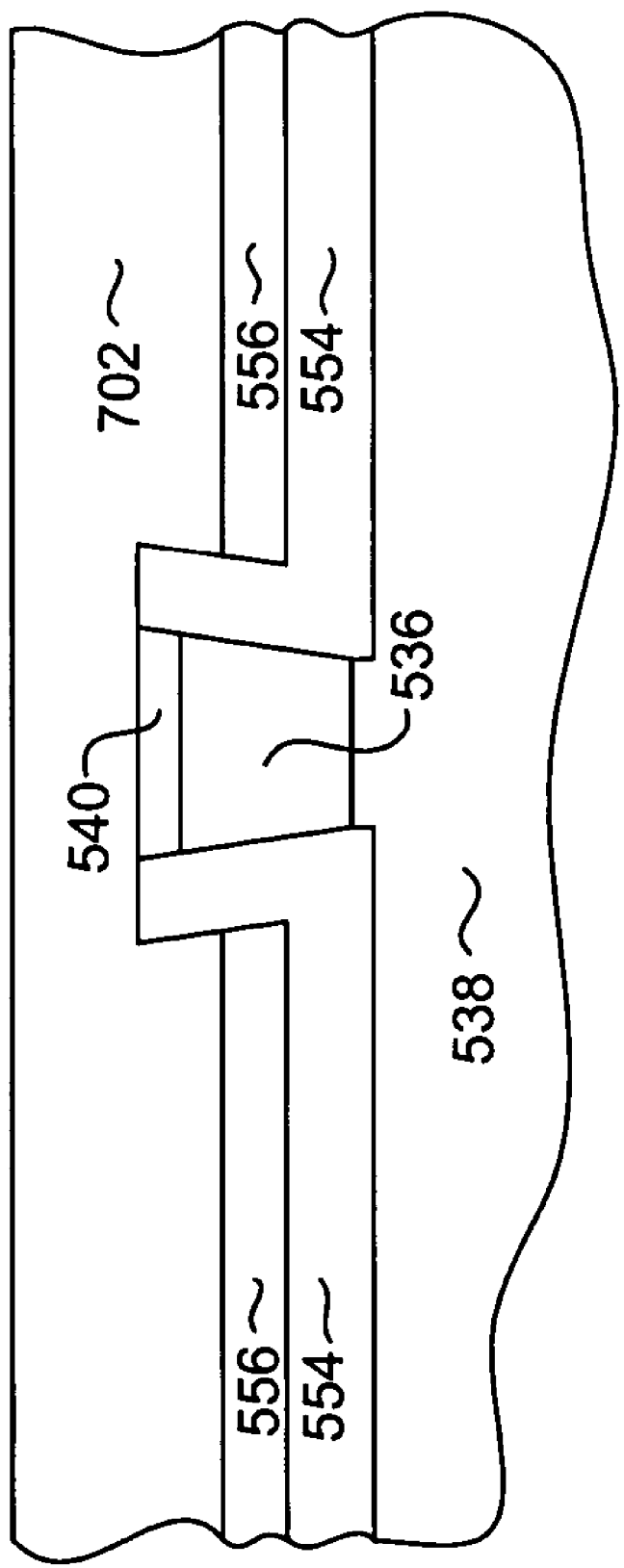

With reference to FIG. 7B, a method for constructing such a partial wrap around side shield 702 includes step similar to those described above, up to and including the deposition of RIEable material 556, chemical mechanical polishing down to the CMP stop layer 542 and removal of the CMP stop layer 542 by RIE. However in order to create the partial wrap around shield 702, the RIE used to remove the RIEable layer 556 is only performed sufficiently to remove a portion of the RIEable layer 556. The RIE is stopped at such a point that a desired amount of RIEable layer 556 remains over the side gap layer 554. Sufficient RIEable material 556 may remain such that the top of the RIEble layer 556 extends to a level such as about half way up the write pole 536, or between ¼ and ¾ of the distance up the write pole 536 or any desired distance with respect to the height of the write pole 536. With reference now to FIG. 7C, the outer edges of the partial wrap around trailing shield 702 can then be photolithograhically defined and a magnetic material such as NiFe deposited as described above.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A magnetic head for perpendicular magnetic recording, the write element comprising:
    a read element; and
    a write head, the write head further comprising;
    a write pole extending to an air bearing surface, the write pole having a trailing edge and first and second sides;
    a magnetic return pole located in a leading direction from the write pole and extending to the air bearing surface;
    a wrap around trailing shield constructed of a magnetic material;
    a trailing shield gap formed between the trailing edge of the write pole and the wrap around trailing shield;
    a side gap formed between the write pole and the wrap around trailing shield, the first trailing shield gap having a thickness that is different than a thickness of the side gap;
    a magnetic pedestal, located at the air bearing surface, contacting the magnetic return pole and extending toward the write pole; and
    first and second magnetic pedestal extensions, located at the air bearing surface and each connected with both the magnetic pedestal and the wrap around trailing shield;
    wherein the trailing shield is located away from the read element, such that the trailing shield magnetically shields the write head, but not the read element.

2. A write element as in claim 1, wherein the trailing shield gap is larger than the side gap.

3. A write element as in claim 1, wherein the trailing shield gap is filled with a first non-magnetic material, and the side gap is filled with a second non-magnetic material and wherein the first and second non-magnetic materials are different materials.

4. A write element as in claim 1, wherein the wailing shield gap is filled with a first non-magnetic material, and the side gap is filled with a second non-magnetic material and wherein the first and second nonmagnetic materials are separately deposited layers of the same material.

5. A write element as in claim 1, wherein the write pole has a trapezoidal shape.

6. A write element as in claim 1, wherein the write pole has a laminated structure including layers of magnetic material separated by layers of non-magnetic material.

7. A write element as in claim 1, wherein the write pole has a leading edge opposite the trading edge, and wherein the wrap around trailing shield has wrap around side portions that extend to a level coplanar with the leading edge of the write pole.

8. A write element as in claim 1, wherein the write pole has a leading edge opposite the trailing edge, and wherein the wrap around trailing shield has wrap around side portions that extend beyond the leading edge of the write pole.

9. A write element as in claim 1, wherein the write pole has a leading edge opposite the trailing edge, and wherein the wrap around trailing shield has a wrap around side portion with a leading edge that terminates at a level that is between a level of the trailing edge and a level of the leading edge.

10. A write element as in claim 1, wherein the write pole has a leading edge opposite the trailing edge, and wherein the wrap around trailing shield has a wrap around side portion with a leading edge that terminates at a point that is a distance ¼ to ¾ the distance from the trailing edge to the leading edge.

11. A write element as in claim 1, wherein the write pole has a leading edge opposite the trailing edge, and wherein the wrap around trailing shield has a wrap around side portion that extends in the direction from the trailing edge inward the leading edge a distance of ½ about the distance between the trailing edge and the leading edge.

12. A write clement as in claim 1, wherein the trailing edge gap comprises NiCr.

13. A write element as in claim 1, wherein the side gap comprises a material selected from the list consisting of $Al_2O_3$, Ru, Ta, Au, Cr or W.

14. A write element as in claim 1, wherein the trailing edge gap comprises NiCr and the side gap composes a material selected from the list consisting of $Al_2O_3$, Ru, Ta, Au, Cr or W.

15. A write element for perpendicular magnetic recording: comprising:
a write pole, constructed of a magnetic material having a trailing edge and a side;
a wrap around trailing shield separated from the trailing edge of the write pole by a first non-magnetic gap material, and separated from the side of the write pole by a second non-magnetic gap material that is different from the first non-magnetic gap material;
a magnetic return pole located in a leading direction relative to write pole, such that the write pole is between the return pole and the trailing wrap around shield;
a magnetic pedestal connected with the return pole at an air bearing surface and extending toward, but not to the write pole;
a magnetic pedestal extension connected with the magnetic pedestal and the wrap around trailing shield and
a read element located in a leading direction relative to the return pole, such that the return pole is located between the read element and the write pole.

16. A element write element as in claim 15 wherein the first gap material comprises NiCr and the second gap material comprises a material selected from the list consisting of $Al_2O_3$, Ru, Ta, Au, Cr or W.

17. A method for constructing a magnetic write head for use in perpendicular magnetic recording, the method comprising:
providing a substrate;
depositing a magnetic write pole material on the substrate;
depositing a non-magnetic trailing shield gap material;
depositing a chemical mechanical polish stop layer;
forming a mask;
performing an ion mill to remove selected portions of the write pole material to form a write pole;
depositing a layer of side gap material,;
depositing a RIEable material;
performing a chemical mechanical polishing process to remove the deposited materials down to a level of the CMP stop layer;
performing a reactive ion etch sufficiently to remove a selected amount of the RIEable material; and
depositing a magnetic material to form a magnetic shield.

18. A method as in claim 17 wherein the trailing shield gap material is a different material than the side shield material.

19. A method as in claim 17, wherein the trailing shield gap material is NiCr.

20. A method as in claim 17, wherein the side shield gap material comprises a material selected from the group consisting of $Al_2O_3$, Ru, Ta, Au, Cr or W.

21. A method as in claim 17, wherein the RIE is performed sufficiently to remove substantially all of the RIEable material.

22. A method as in claim 17, wherein the RIE is terminated before all of the RIEable material has been removed.

23. A method for constructing a magnetic write element for use in perpendicular recording, the method comprising:
depositing a layer of magnetic write pole material;
depositing a first layer of non-magnetic gap material on the layer of write pole material;
removing selected portions of the write pole material to define a write pole having first and second laterally opposed sides; and
depositing a second layer of non-magnetic gap material at least a portion of the second non-magnetic gap material contacting the sides of the write pole, the second gap material being a different material than the first gap material.

* * * * *

UNITED STATES PATENT AND TRADEMARK OFFICE
CERTIFICATE OF CORRECTION

| | |
|---|---|
| PATENT NO. | : 7,649,712 B2 |
| APPLICATION NO. | : 11/116753 |
| DATED | : January 19, 2010 |
| INVENTOR(S) | : Quang Le et al. |

Page 1 of 1

It is certified that error appears in the above-identified patent and that said Letters Patent is hereby corrected as shown below:

In claim 1, column 12, line 44, please replace "comprising;" with --comprising:--.

Signed and Sealed this

Eighth Day of June, 2010

David J. Kappos
*Director of the United States Patent and Trademark Office*